United States Patent
Ohmi et al.

(10) Patent No.: US 6,215,806 B1
(45) Date of Patent: *Apr. 10, 2001

(54) EXCIMER LASER GENERATOR PROVIDED WITH A LASER CHAMBER WITH A FLUORIDE PASSIVATED INNER SURFACE

(75) Inventors: Tadahiro Ohmi, 2-1-17-301, Komegafukuro, Aoba-ku, Sendai-shi; Yasuyuki Shirai, Sendai; Naoto Sano, Utsunomiya, all of (JP)

(73) Assignees: Canon Kabushiki Kaisha, Tokyo; Tadahiro Ohmi, Miyagi-ken, both of (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/812,288

(22) Filed: Mar. 6, 1997

(30) Foreign Application Priority Data

| Mar. 7, 1996 | (JP) | 8-079568 |
|---|---|---|
| Mar. 7, 1996 | (JP) | 8-079569 |
| Mar. 7, 1996 | (JP) | 8-079570 |
| Mar. 7, 1996 | (JP) | 8-079574 |

(51) Int. Cl.[7] ............................................. H01S 3/22
(52) U.S. Cl. .............................. 372/57; 372/58; 372/34
(58) Field of Search .............................. 372/57, 59, 34, 372/87, 58; 428/472.2, 215; 148/287; 355/53; 427/53.4

(56) References Cited

U.S. PATENT DOCUMENTS

| 4,888,203 | * | 12/1989 | Rothschild et al. | 427/255.3 |
|---|---|---|---|---|
| 5,009,963 | * | 4/1991 | Ohmi et al. | 428/472.2 |
| 5,018,161 | * | 5/1991 | Akins et al. | 372/57 |
| 5,029,177 | | 7/1991 | Akins et al. | 372/57 |
| 5,220,575 | * | 6/1993 | Bosch et al. | 372/87 |
| 5,224,998 | | 7/1993 | Ohmi et al. | 118/720 |
| 5,260,961 | * | 11/1993 | Zhou et al. | 372/57 |
| 5,407,492 | * | 4/1995 | Ohmi et al. | 148/287 |
| 5,450,436 | * | 9/1995 | Mizoguchi et al. | 372/57 |
| 5,483,311 | * | 1/1996 | Sakakibara et al. | 355/53 |
| 5,642,347 | * | 6/1997 | Wakabayashi et al. | 372/57 |
| 5,748,656 | * | 5/1998 | Watson et al. | 372/57 |
| 5,919,561 | * | 7/1999 | Fuchs et al. | 428/336 |
| 5,969,799 | * | 10/1999 | Sano | 355/53 |

FOREIGN PATENT DOCUMENTS

| 0352061 | | 1/1990 | (EP) | C23C/8/08 |
|---|---|---|---|---|
| 0446079 | | 9/1991 | (EP) | H01L/23/29 |
| 0 495 755 A1 | * | 7/1992 | (EP) | . |
| 3215656 | | 9/1991 | (JP) | . |
| 4-066657 | | 3/1992 | (JP) | . |
| 8-092684 | | 4/1996 | (JP) | . |

* cited by examiner

*Primary Examiner*—Leon Scott, Jr.
(74) *Attorney, Agent, or Firm*—Fitzpatrick, Cella, Harper & Scinto

(57) ABSTRACT

An excimer laser generating system includes a laser chamber whose inner surface is covered with a fluorine-passivated surface. Preferably, the surfaces of a blower and heat exchanger disposed in the laser chamber are also covered with a fluorine-passivated surface. The fluorine-passivated surface may be formed of a wide variety of materials including an aluminum oxide film, a fluoride film containing aluminum fluoride and magnesium fluoride, iron fluoride, and nickel fluoride. Preferably, the excimer laser generation system includes a gas supply system having an inert gas purging system so that gas sources can be replaced without exposing the inside of gas supply pipes to atmosphere. With the above arrangement, the excimer laser generating system can generate a laser beam pulse whose energy and shape are maintained constant for a long period of operation time without encountering serious degradation. The invention also provides a high-reliability step-and-repeat exposure apparatus using the above excimer laser generating system, capable of exposing a very fine pattern.

34 Claims, 17 Drawing Sheets

AFTER LAPPING

AFTER CLEANING

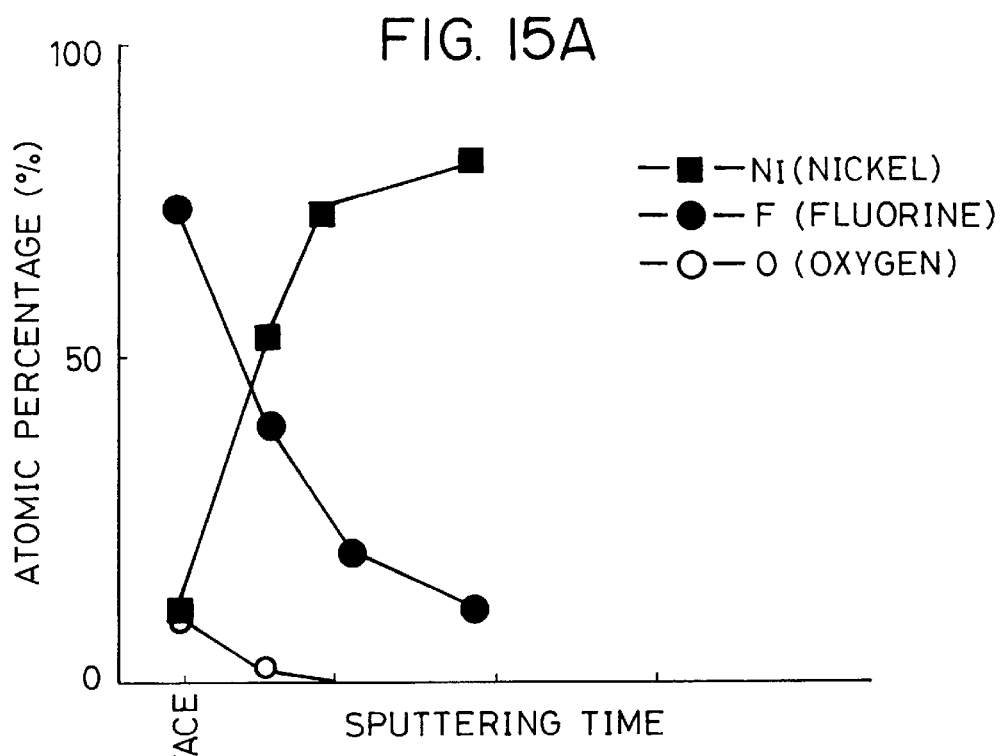
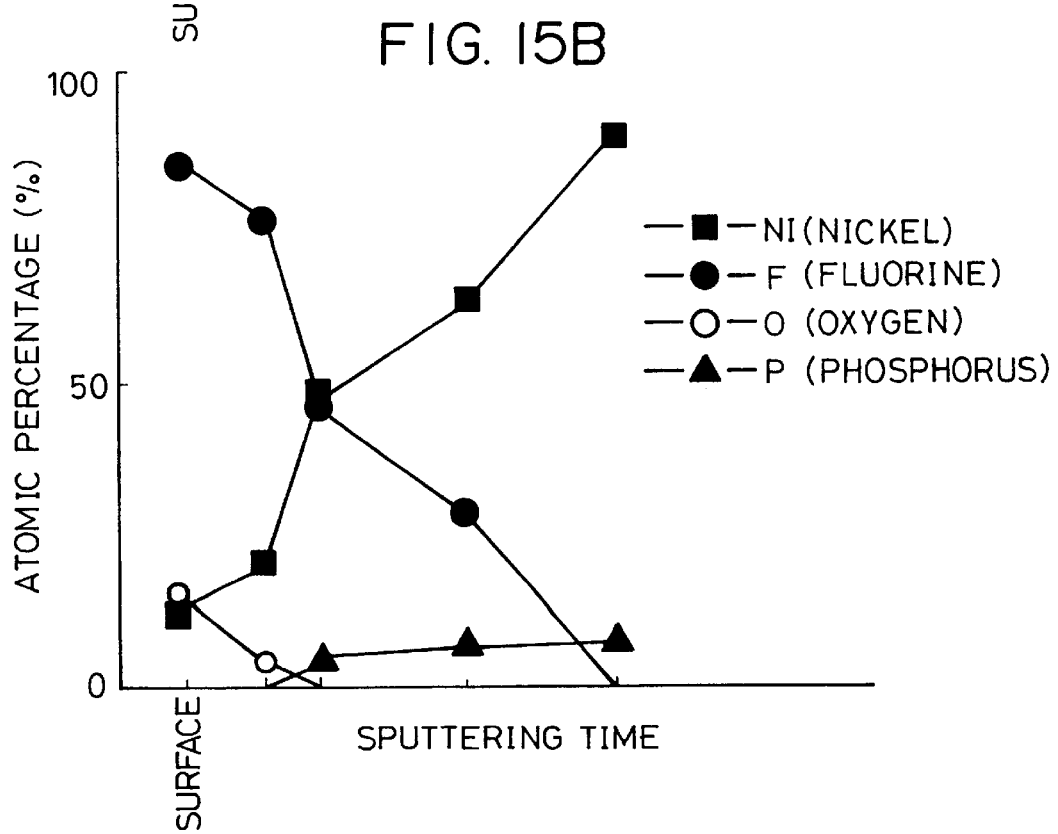

US 6,215,806 B1

EXCIMER LASER GENERATOR PROVIDED WITH A LASER CHAMBER WITH A FLUORIDE PASSIVATED INNER SURFACE

BACKGROUND OF THE INVENTION

1. Field of the Invention

The present invention relates to an excimer laser generator used to process various materials such as metal, resin, glass, ceramics, or semiconductor, or used to assist a chemical reaction. More particularly, the present invention relates to an excimer laser generator capable of generating a laser beam which is stable in its energy and shape and having a long life. The present invention also relates to a blower and a heat exchanger for use in such an excimer laser generator. Furthermore, the present invention relates to a step-and-repeat exposure apparatus using such an excimer laser generator.

2. Description of the Related Art

An excimer laser generating system is the only laser generator that can generate a high output laser beam with a wavelength in an ultraviolet region, and is expected to be used in a wide variety of applications such as electronic and chemical industries and energy industries.

Herein the "excimer laser generator" or "excimer laser generating system" refers to a system for generating an excimer laser beam. In an excimer laser generating system, a laser gas such as Ar, Kr, Xe, KrF, or ArF filled in a manifold is excited by means of discharging or electron beam radiation. Excited atoms are combined with atoms in the ground state, thus creating molecules which can exist only in excited states. These molecules are called excimers. Since the excimers are unstable, they immediately emit ultraviolet light and fall to the ground state. This transition is called bond-free transition. In excimer lasers, the ultraviolet light generated by the bond-free transition is amplified by an optical resonator composed of a pair of mirrors. The amplified light is emitted to the outside as a laser beam.

With reference to FIG. 1, an excimer laser generating system disclosed in U.S. Pat. No. 5,029,177 is described below.

As shown in FIG. 1, the excimer laser generating system includes: a laser chamber 1; an oscillation spectrum narrowing module 2 for controlling the oscillation line width; a high-voltage pulse power module 3; an optical monitor module 4 for detecting the energy intensity and the wavelength of the laser output; a high-voltage power supply 5; and a controller 6 for controlling the entire parts of the excimer laser generating system.

When the excimer laser generating system is used as an exposure light source of a step-and-repeat exposure apparatus for producing an electron device, the computer controller 6 is connected via an interface 7 to a control unit 8 and a computer 9 of the step-and-repeat exposure apparatus.

The laser chamber 1 is filled with a gas such as $F_2$, Kr, or Ne. A high-voltage pulse generated by the pulse power module 3 is applied to the cathode electrode in the laser chamber so that a discharge occurs in the gas, which causes light emission. The light is repeatedly reflected between an output mirror 10 and an optical system in the spectrum narrowing module 2, and is amplified during the travel. The amplified light is emitted to the outside.

To obtain a laser beam having a desired wavelength, a part of the emitted laser beam is reflected by a half-mirror 11 and directed to the optical monitor module 4. The optical monitor module 4 measures the wavelength and other characteristics of the light. In response to the measurement result provided by the optical monitor module 4, a stepping motor 12 is driven so that the optical system of the spectrum narrowing module 2 is optimized. The optical power of the laser beam is also monitored by the optical monitor module 4.

FIG. 2 is a cross-sectional view of the laser chamber 1, taken in a direction perpendicular to the direction of laser oscillation.

As shown in FIG. 2, the laser chamber 1 has two aluminum housing members 13 and 14 which are combined together via an O-ring 15 so as to form a sealed chamber. A cathode electrode 18 is fixed to the chamber 1 via a cathode electrode supporting member 17 and an insulator 16. Anode electrode 19 is fixed to the housing member 13 via an anode electrode supporting member 20. The laser chamber 1 further includes a connector 21 for connecting the cathode electrode 18 to the pulse generator 3. There is also provided a sealing member such as an O-ring 22.

Inside the laser chamber 1, there is a blower 23 for circulating gas within the chamber 1. A heat exchanger including a heat-transfer pipe is also provided in the chamber 1 to cool the gas heated by discharging. The laser chamber 1, the blower 23, and the heat exchanger 24 are made of stainless steel or an aluminum alloy wherein the outer surfaces of these elements are usually electro-polished or bright-annealed. An air filter 25 is fixed to the housing so that gas is introduced into the filter via a gas inlet 26 thereby removing particles such as metal fluoride particles produced by the reaction of the electrode metal with fluorine gas.

Referring to FIG. 3, a gas supplying system which has been proposed previously by the inventor of the present invention will be described below. This gas supplying system has been designed to properly supply gas into the laser chamber 1.

In the specific example shown in FIG. 3, there are three gas supply lines: a 1% Kr/Ne gas supply line 31, a 1% $F_2$/1% Kr/Ne gas supply line 32; and a He gas supplying line 33. The respective gas supply lines have orifices 34, 35, 36 for controlling the flow rates and also have valves 37, 38, and 39 connected to a manifold 40. He gas is used as a purging gas when window plates of the laser chamber are replaced with new ones.

A plurality of gas supply pipes are connected to the manifold 40. Of these gas supply pipes, a gas supplying connection pipe 41 has a chamber valve 42 and a valve 43. The manifold 40 is also connected to a $F_2$ gas supply pipe 44 which is connected to the connection pipe 41 via an injection valve 45 and a flow rate control orifice 46.

The gas supplying system further includes: a spring valve 47 which is opened when the pressure in the manifold 40 increases to an abnormally high level greater than an allowable level; an exhaust line 48; a valve 49 which is operated by hand as the valve 43 to exhaust the gas when a trouble occurs inside the laser chamber; $F_2$ gas safening treatment equipment 50; a vacuum pump 51; and a pressure gauge 52.

When it is desirable to fill the laser chamber with a laser discharging gas containing 0.1% $F_2$, the laser discharging gas can be introduced into the chamber as follows. First, 1% $F_2$/1% Kr/Ne gas is introduced, while monitoring its pressure, into the chamber 53 via the manifold 40 and the pipe 41 until the pressure reaches 30 kPa. Then 1% Kr/Ne gas is introduced until the pressure reaches 300 kPa so that the chamber is filled with the mixed gas containing 0.1% $F_2$.

The $F_2$ concentration decreases with the repetition of laser oscillation. This causes a reduction in the optical output power of the laser. Therefore, each time the optical output power of the laser drops to a level lower than a predetermined value, it is required to supply a proper amount of 1% $F_2$/1% Kr/Ne gas into the chamber 53 via the manifold 40 and the pipe 44.

The conventional excimer laser generating system has the following problems which were not known in the art before the inventor of the present invention found them.

A first problem in the conventional excimer laser generating system is that the $F_2$ gas has to be supplied as frequently as every $5\times10^6$ pulses to obtain required optical output power.

A second problem is that the reaction produces fluoride which absorbs laser light. This makes it impossible to obtain stable optical power. For example, the formation of fluoride can cause a variation in the optical output power as large as 5% to 10%. To remove the above fluoride, the entire gas in the chamber 1 must be replaced with a new gas every $5\times10^7$ to $1\times10^8$ pulses.

A third problem is that some fluoride produced by chemical reaction in the chamber deposits on a window of the laser chamber. As a result, the window must be replaced every $1\times10^9$ pulses.

A fourth problem is that great degradation occurs in the electrodes 18 and 19 in the laser chamber, and thus these electrodes must be replaced every $3\times10^9$ pulses.

As described above, the operation life of the conventional excimer laser generating system is very short.

In addition to the above problems of short life, the conventional excimer laser generating system also has the following problems to be solved.

A fifth problem is that the accuracy of the pressure gauge for monitoring the gas pressure is not high enough to control the mixing ratio of the gas introduced into the laser chamber. This results in poor controllability of the optical output power of the laser.

A sixth problem is that the inside of any of the gas supply pipes is exposed to atmosphere, which can occur when a gas source of the gas supplying system is replaced, a small amount of water is adsorbed on the inner wall of the pipe and it is difficult to perfectly remove it by a common outgassing technique. When $F_2$ gas is introduced into the gas supply pipe, the $F_2$ gas can react with the adsorbed water, which makes it difficult to precisely supply a desired amount of $F_2$ into the laser chamber. The contamination of water in the laser chamber results in degradation of the chamber and thus results in a reduction in life.

The above problems have been found by the inventors of the present invention during their activity of developing an excimer laser generating system capable of stably outputting optical power and having a long life. The present invention has been achieved by solving these problems.

SUMMARY OF THE INVENTION

It is an object of the present invention to provide an excimer laser generating system capable of generating a laser pulse having a constant pulse shape and constant energy without variations from pulse to pulse.

It is another object of the present invention to provide an excimer laser generating system which is needed to inject fluorine gas less frequently.

It is still another object of the present invention to provide an excimer laser generating system capable of outputting stable optical power without encountering absorption of laser light by impurities.

It is a further object of the present invention to provide an excimer laser generating system whose laser chamber has a long life.

It is another object of the present invention to provide an excimer laser generating system capable of stably generating a laser beam without encountering degradation even if a small amount of water is incorporated into gas.

It is still another object of the present invention to provide an excimer laser generating system having a laser chamber containing a precisely controlled amount of gas thereby achieving high reproducibility in the output of the laser pulse.

It is a further object of the present invention to provide an excimer laser generating system which can be used in a highly reliable fashion for a long time to form a fine pattern having a line width as small as less than 0.25 μm.

According to an aspect of the present invention, there is provided an excimer laser generating system characterized in that an aluminum oxide film with a surface roughness $Ra \leq 0.1$ μm formed by means of anodic oxidation on a surface with a surface roughness $Ra \leq 0.1$ μm is provided on the inner wall of a laser chamber of the excimer laser generating system.

According to another aspect of the present invention, there is provided a blower for use in an excimer laser generating system, characterized in that an aluminum oxide film with a surface roughness $Ra \leq 0.1$ μm formed by means of anodic oxidation on a surface with a surface roughness $Ra \leq 0.1$ μm is provided on the surface of the blower.

According to still another aspect of the present invention, there is provided a heat exchanger for use in an excimer laser generating system, characterized in that an aluminum oxide film with a surface roughness $Ra \leq 0.1$ μm formed by means of anodic oxidation on a surface with a surface roughness $Ra \leq 0.1$ μm is provided on the surface of the heat exchanger.

According to a further aspect of the present invention, there is provided a step-and-repeat exposure apparatus including: an excimer laser generating system described above; and a stage for carrying a substrate.

According to another aspect of the present invention, there is provided an excimer laser generating system characterized in that a fluoride film including aluminum fluoride and magnesium fluoride is formed on the inner surface of a laser chamber in the excimer laser generating system.

According to still another aspect of the present invention, there is provided a blower for use in an excimer laser generating system characterized in that a fluoride film including aluminum fluoride and magnesium fluoride is formed on the surface of the blower.

According to a further aspect of the present invention, there is provided a heat exchanger for use in an excimer laser generating system characterized in that a fluoride film including aluminum fluoride and magnesium fluoride is formed on the surface of the heat exchanger.

According to an aspect of the present invention, there is provided a step-and-repeat exposure apparatus including: an excimer laser generating system described above; and a stage for carrying a substrate.

According to another aspect of the present invention, there is provided an excimer laser generating system characterized in that a fluoride film including iron fluoride is formed on the inner surface of a laser chamber of the excimer laser generating system.

According to still another aspect of the present invention, there is provided an excimer laser generating system, wherein a fluoride film including iron fluoride is formed on the surface of a blower located in the laser chamber of the excimer laser generating system.

According to a further aspect of the present invention, there is provided an excimer laser generating system, wherein a fluoride film including iron fluoride is formed on the surface of a heat exchanger located in the laser chamber of the excimer laser generating system.

According to another aspect of the present invention, there is provided an excimer laser generating system including a gas supply system for supplying a gas to a laser chamber, the gas supply system including a plurality of gas sources each connected via their own gas supply pipe to a manifold which is further connected to the laser chamber via a pipe wherein at least those parts in contact with $F_2$ gas are covered with a fluoride film.

According to another aspect of the present invention, there is provided an excimer laser generating system including a gas supply system for supplying a gas to a laser chamber, the gas supply system including a plurality of gas sources each connected via their own gas supply pipe to a manifold which is further connected to the laser chamber via a pipe and a flow meter provided in the path of the pipe.

According to another aspect of the present invention, there is provided an excimer laser generating system including a gas supply system for supplying a gas to a laser chamber, the gas supply system including a plurality of gas sources each connected via their own gas supply pipe to a manifold which is further connected to the laser chamber via a pipe, the gas supply system also including a purging system for purging the gas supply pipes with an inert gas.

According to another aspect of the present invention, there is provided a step-and-repeat exposure apparatus including an excimer laser generating system described above.

According to still another aspect of the present invention, there is provided an excimer laser generating system characterized in that a nickel fluoride film with a thickness equal to or greater than 100 nm is formed on the inner surface of a laser chamber of the excimer laser generating system.

According to a further aspect of the present invention, there is provided a blower for use in an excimer laser generating system characterized in that a nickel fluoride film is formed on the surface of the blower.

According to another aspect of the present invention, there is provided a heat exchanger for use in an excimer laser generating system characterized in that a nickel fluoride film is formed on the surface of the heat exchanger.

According to still another aspect of the present invention, there is provided a step-and-repeat exposure apparatus including: an excimer laser generating system described above; and a stage for carrying a substrate.

BRIEF DESCRIPTION OF THE DRAWINGS

FIG. 8A is a graph illustrating the breakdown voltage for Sample a and

FIG. 15(A) is a graph illustrating the fluorine concentration profile of a fluoride passivation film formed on a thin and pure nickel film on a base material, and FIG. 15(B) is a graph illustrating the fluorine concentration profile of a fluoride passivation film formed on a thin nickel-phosphorus film on a base material;

DESCRIPTION OF THE PREFERRED EMBODIMENTS

Figure 2:
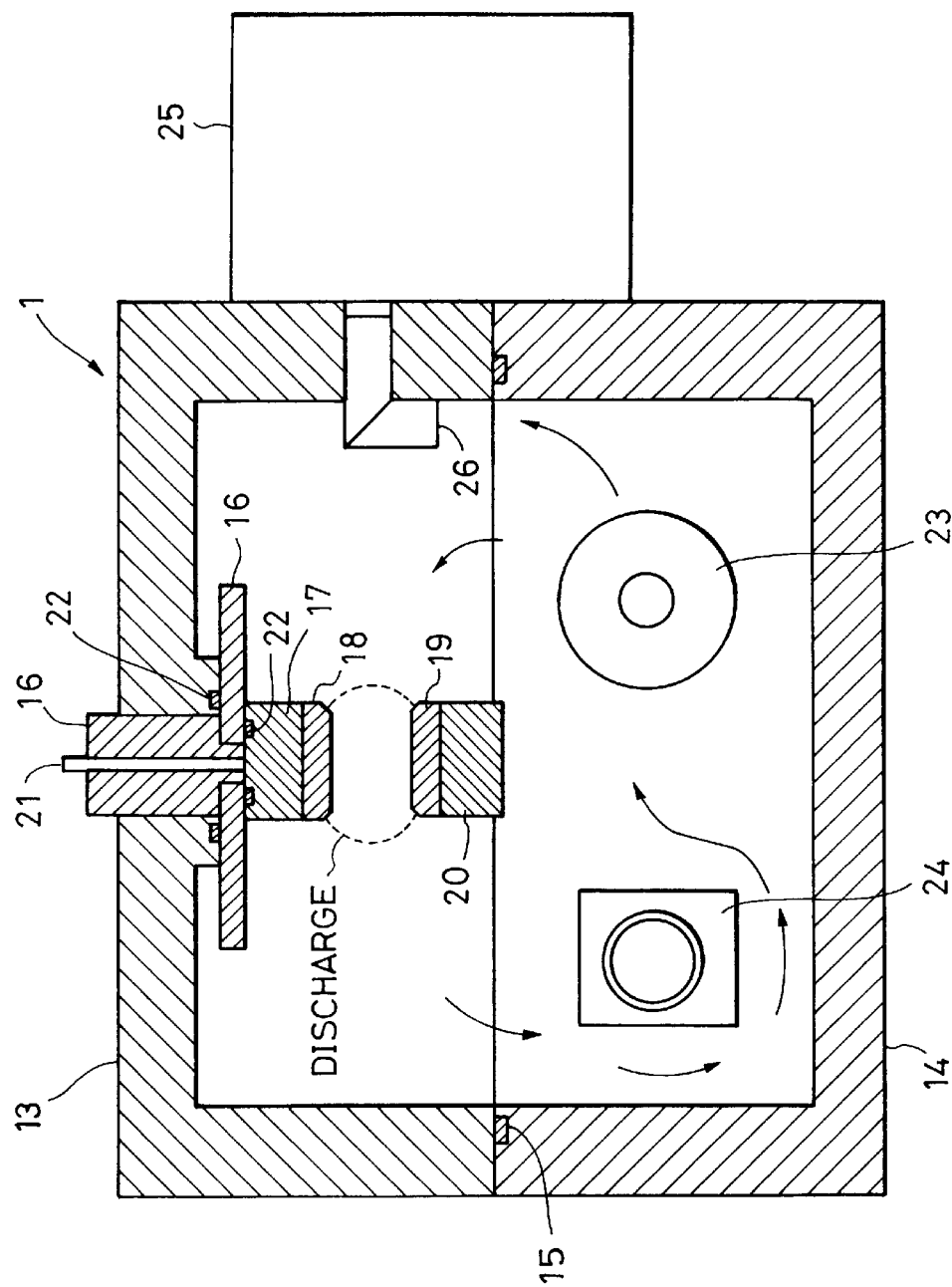
FIG. 2 is a cross-sectional view schematically illustrating the structure of a laser chamber.
Figure 4:
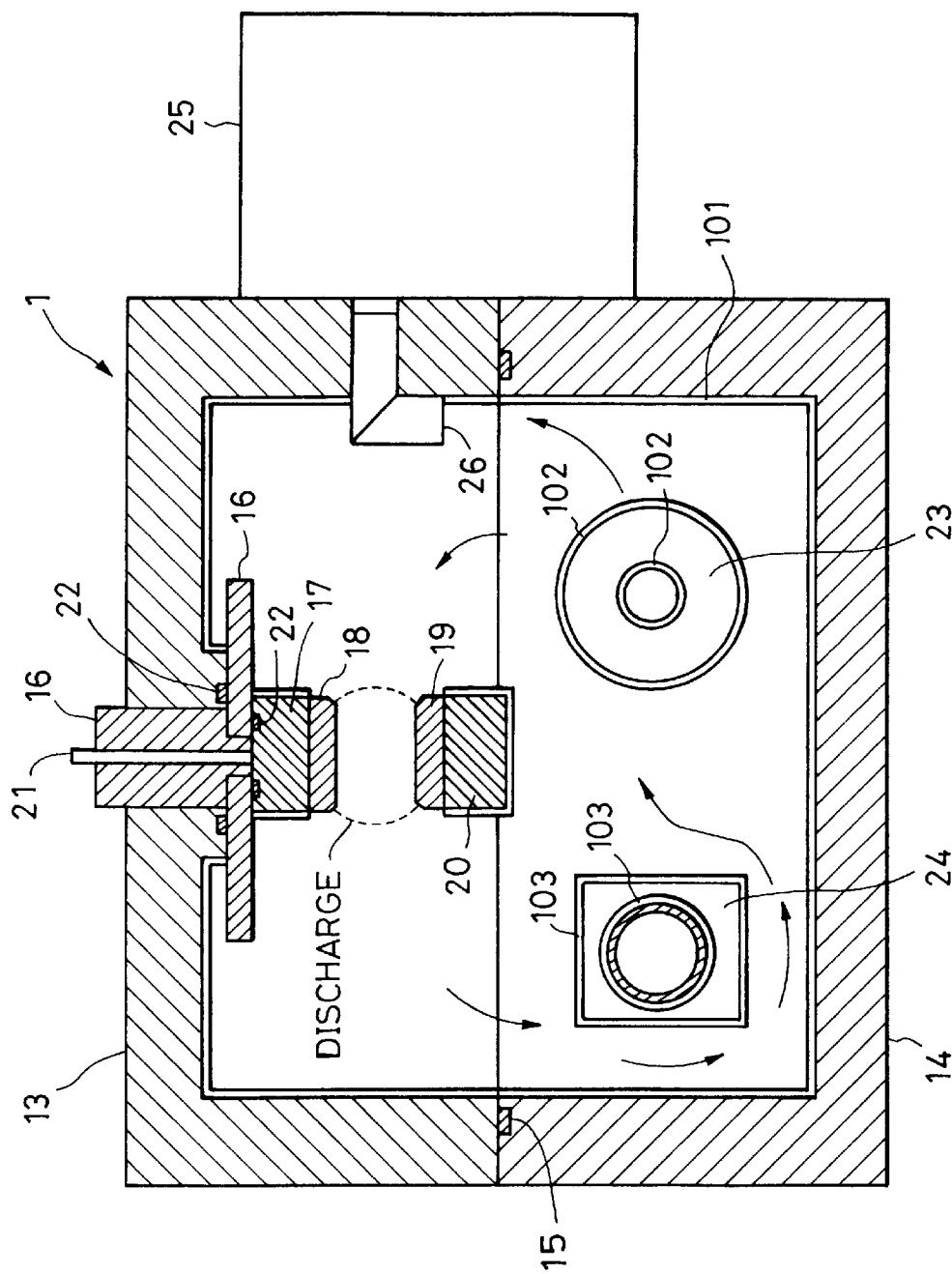
FIG. 4 is cross-sectional view of a laser chamber for use in an excimer laser generating system, according to the present invention.

FIG. 4 is a cross-sectional view of a laser chamber used in an excimer laser generating system according to a preferred embodiment of the present invention, in which similar parts to those in FIG. 2 are denoted by similar reference numerals.

The inner wall of the laser chamber 1 is covered with a fluorine passivation film 101 so that the surface of the inner wall of the laser chamber is passivated with the film 101. The surface of the blower. 23 for generating a flow of gas in the chamber 1 is covered with a fluorine passivation film 102. The surface of the heat exchanger 24 for reducing the temperature of the gas in the chamber 1 is covered with a fluoride passivation film 103. The surfaces of the blower 23 and the heat exchanger 24 are passivated with these films 102 and 103. In the case where the electrode supporting members 17 and 20 are made of conductive metal with fluorine passivated surfaces, it is desirable that the surfaces thereof also be covered with a fluorine passivation film.

In the excimer laser generating system, a laser beam is generated as follows.

First, the chamber 1 is filled with a laser gas. The blower 23 and the heat exchanger 24 are started so that a flow of gas is generated in a direction denoted by the arrow in FIG. 4.

A pulse voltage is applied between a pair of electrodes 18 and 19 so that a glow discharge occurs in the gas. The discharging energy creates excited dimers. When these excited dimers return to the ground state, light is emitted. The mirror 10 and the module 2 cause the light to have oscillation thus creating a laser beam.

The gas heated to a high temperature by the discharging is cooled by the heat exchanger 24. The laser gas is supplied by the blower 23 to the region between the pair of the electrodes so that a laser pulse is generated repeatedly.

The fluorine passivation films used in the excimer laser generator according to the present invention will be described in further detail below.

ALUMINUM OXIDE FILM

In the present invention, an aluminum oxide film as a fluorine passivation film is preferably formed as follows. The surface of an aluminum alloy serving as a base material is mechanically lapped so that the surface has a good flatness Ra equal to or less than 0.1 $\mu$m. The contaminants present on the surface of the aluminum alloy are removed by means of a polishing process with an oxidizing solution. The surface of the aluminum alloy is then subjected to anodic oxidation.

To form a high-quality aluminum oxide film, it is desirable that the aluminum alloy be produced by incorporating 2.0 to 5.0 wt % magnesium (Mg) into high-purity aluminum (Al) containing unintentional impurities whose concentration is less than 100 ppm. The incorporation of magnesium into aluminum allows improvements in mechanical strength and corrosion resistance at high temperatures. It is more desirable that the aluminum alloy further includes 0.05 to 0.15 wt % zirconium (Zr).

If the surface of the aluminum alloy is mechanically lapped after a machining process so that it has a good surface flatness Ra equal to or less than 0.1 $\mu$m, it is possible to improve the quality of the aluminum oxide film formed on the surface of the aluminum alloy by means of anodic oxidation.

Figure 5:
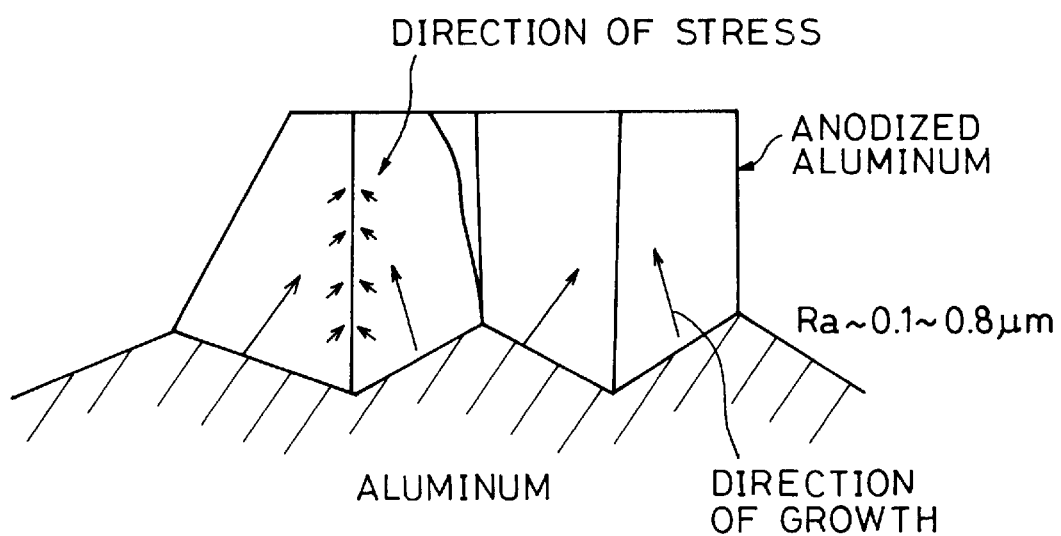
FIG. 5 is a schematic representation of a process of forming an aluminum oxide film.

After mechanical machining, the surface roughness Ra is 0.1 $\mu$m or greater. If anodic oxidation is performed on a surface having such a roughness, aluminum oxides are grown in various directions as shown in FIG. 5. As a result, strong stresses are generated. The stresses inevitably cause defects in the aluminum oxide film, which result in a great reduction in corrosion resistance. On the other hand, if the surface is mechanically lapped to have a good flatness Ra equal to or less than 0.1 $\mu$m, an aluminum oxide is grown in substantially the same direction. This causes a reduction in the stress created during the growth of the aluminum oxide. As a result, the corrosion resistance is improved. For the reasons described above, it is desirable that the surface roughness Ra of the aluminum alloy be equal to or less than 0.1 $\mu$m and it is more desirable that the surface roughness be equal to or less than 0.01 $\mu$m.

If the mechanically-lapped surface is further treated with an oxidizing solution so as to remove contamination which has deposited during the lapping process, the quality of the aluminum oxide film formed by anodic oxidation after the above treatment is further improved as will be described below.

Figure 6:
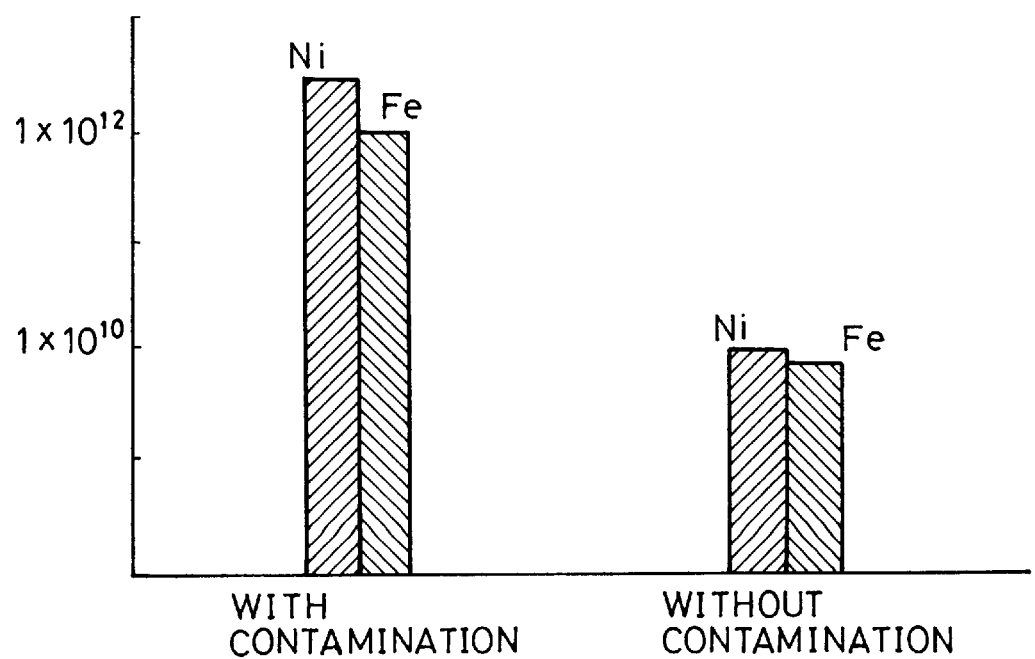
FIG. 6 is a graph illustrating the result of total-reflection X-ray spectroscopy analysis.

In the anodic oxidation process, an aluminum oxide is formed as a result of reaction of aluminum supplied from a base material with oxygen supplied from an electrolyte. If contaminants such as Fe, Ni, C, or Si introduced during the lapping process remain on the surface, these contaminants are oxidized during the anodic oxidation process, and the resultant oxides are incorporated into the aluminum oxide film. This causes degradation in the quality of the aluminum oxide film. In particular, great degradation in quality occurs when Ra$\leq$0.1 $\mu$m. The above knowledge has been obtained as a conclusion of analysis on the surface of aluminum oxide films by means of total-reflection X-ray spectroscopy (refer to FIG. 6). When an aluminum alloy with 99.9% or higher purity, that is, a high-purity aluminum alloy whose impurity concentration is less than 100 ppm was employed, no impurities were observed in the aluminum oxide film formed thereon.

The magnesium (Mg) contained in the aluminum alloy allows an increase in the mechanical strength of aluminum. To achieve enough of an increase in the mechanical strength, it is desirable that the concentration of magnesium incorporated in the aluminum alloy be greater than 2.0% by weight. However, if the concentration of magnesium is greater than 5.0% by weight, MgO will be produced during the anodic oxidization process. When the magnesium concentration is less than 5% by weight, MgO is not produced during the anodic oxidization process. The reason for this is not clear at present. Zirconium (Zr) is incorporated so as to further increase the mechanical strength. Since the diffusion coefficient of Zr in Al is very small, Zr is not incorporated into the aluminum oxide film.

Figure 7A:
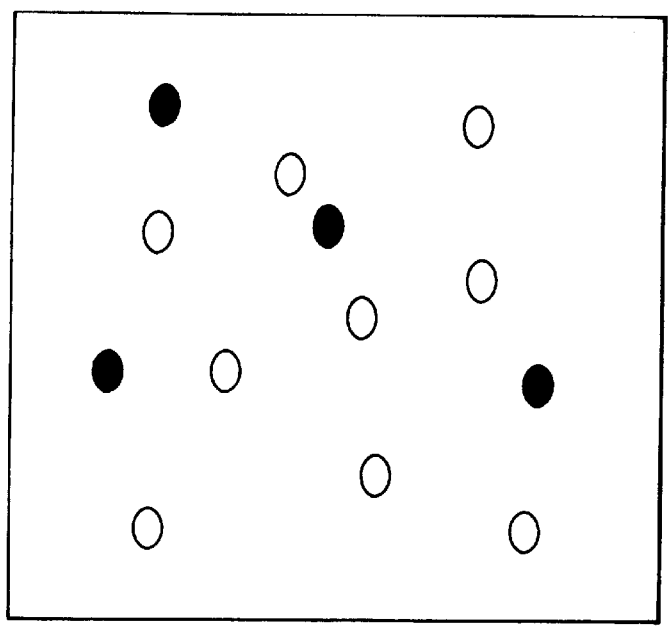
FIG. 7A illustrates surfaces observed before a lapping process.

FIG. 7A shows the surface observed after performing common mechanical lapping on an aluminum alloy (JIS A5052).

Figure 7B:
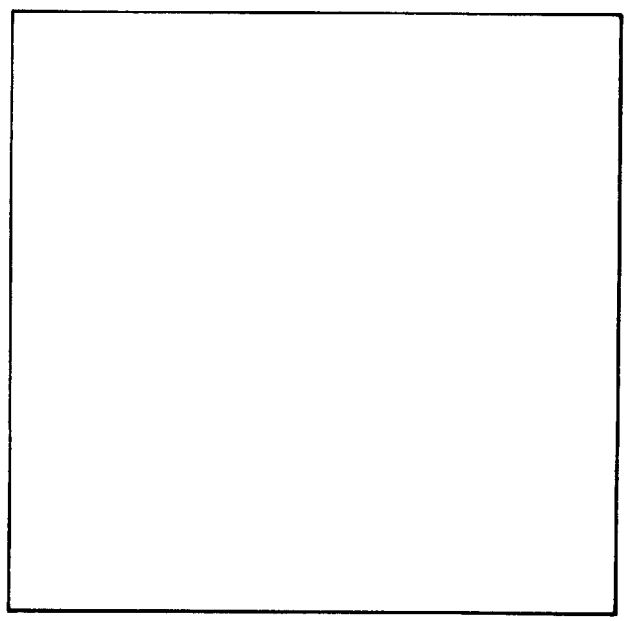
FIG. 7B illustrates surfaces observed after a lapping process.

The composition of JIS A 5052 aluminum alloy is as follows:

Mg: 2.2 to 2.8 wt %
Cr: 0.15 to 0.35 wt %
Si: less than 0.25 wt %
Fe: less than 0.40 wt %
Cu: less than 0.10 wt %
Mn: less than 0.10 wt %
Other: less than 0.15 wt %
Al: the other part As shown in FIG. 7(A), white and black spots of contaminants are observed on the surface after the mechanical lapping process. The analysis by means of EDX (energy dispersion X-ray spectroscopy) has revealed that the white spots are Fe or Ni compounds and black spots are C or Si compounds. It was attempted to remove these contaminants by etching the aluminum alloy. A solution of 70% $HNO_3$+ $H_2O$ was used as an etching solution. After the etching, no contaminants were observed, as shown in FIG. 7(B). The contaminants present on the mechanically-lapped surface can also be removed by etching the aluminum alloy using any other proper etchant. The roughness of the etched surface was measured using a stylus-sensing surface roughness detector (Dektak 3030). The measured surface roughness Ra was about 5 nm and no change was observed compared to that measured before the etching.

The effects of the contaminants produced during the lapping process on the quality of the aluminum oxide film were investigated. Samples were prepared as follows. A JIS A5052 aluminum alloy was lapped until the surface roughness Ra became equal to 5 nm and then it was soaked in a 70% $HNO_3$+$H_2O$ solution for 30 min thereby entirely removing the contaminants. Then anodic oxidation was performed so that a 50 μm thick aluminum oxide film was grown thereon (sample "a"). For comparison, a sample "b" was prepared by performing anodic oxidation immediately after the lapping thereby growing a 50 μm thick aluminum oxide film. The surfaces of both samples a and b were lapped by an amount of 10 μm so that the resultant aluminum oxide films had a thickness of 40 μm and a surface roughness Ra of 5 nm. Finally an electrode with a size of 1 mm×1 mm was formed on the aluminum oxide film of each sample. A voltage was applied between the aluminum alloy serving as the base material and the electrode formed on the aluminum oxide film, and the resistivity and the breakdown voltage were measured for both samples an and b.

Figure 8A:
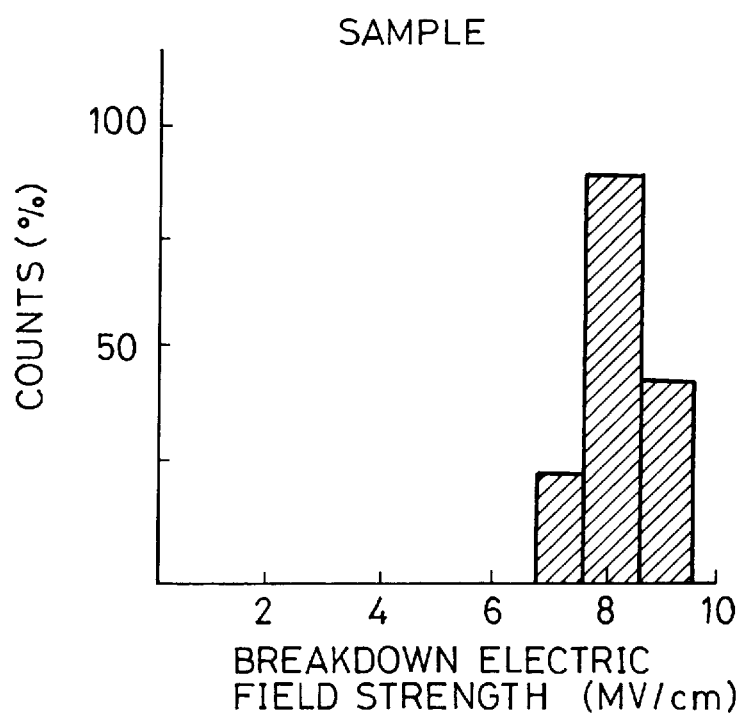
Figure 8B:
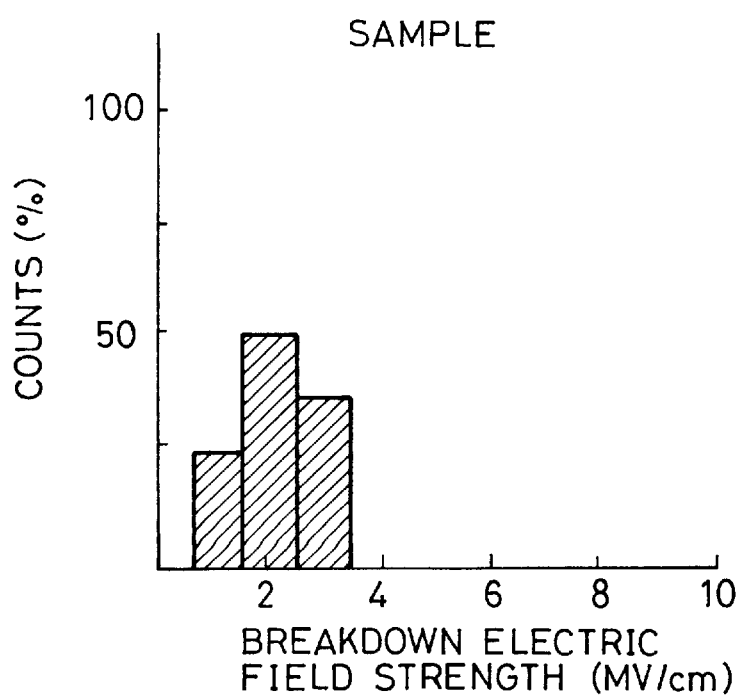
FIG. 8B is a graph illustrating the breakdown voltage for Sample b.

The measurement results are shown in FIGS. 8A and 8B.

From FIGS. 8A and 8B it can be seen that the sample a has a breakdown voltage much higher than that of the sample b.

As described above, it is possible to improve the electrical characteristics of the aluminum oxide film by removing contaminants which deposit on the aluminum alloy during the lapping process.

The etching solution is not limited to the $HNO_3$-based solution, but any other solution may also be employed as long as it can remove contaminants. The composition of the etching solution is not limited to that employed in the above specific example, but the composition may be optimized in accordance to the size of the sample and the composition of the aluminum alloy.

Figure 9:
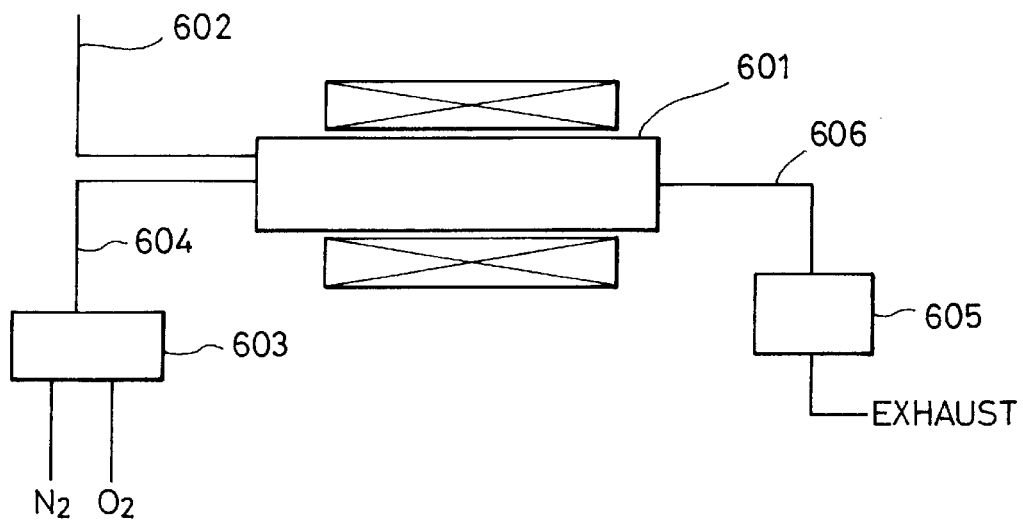
FIG. 9 is a schematic diagram illustrating a system for performing heat treatment.

FIG. 9 illustrates a system used to perform heat treatment on an aluminum oxide film formed by means of anodic oxidation. The system includes an electric furnace 601 whose temperature is PID-controlled so that the temperature uniformity is maintained within ±1° C. over a specified zone of the electric furnace. High-purity $N_2$ gas whose impurity concentration is less than 1 ppm is supplied into the electric furnace 601 via a gas supply line 602. The flow rate of the $N_2$ gas is controlled by a mass flow controller (not shown). A silent-discharge ozone generator 603 is connected via a gas supply line 604 to the electric furnace 601 so that high-purity oxygen and nitrogen ($N_2$) with impurity concentration less than 1 ppm are supplied into the electric furnace wherein the flow rates thereof are controlled by mass flow controllers (not shown). An ozone concentration meter 605 for monitoring the ozone concentration during heat treatment is disposed in the middle of an exhaust line 606.

Using the same procedure as the previous experiment, a sample was prepared by performing anodic oxidation on an aluminum alloy having a clean surface the contaminants on which were removed so that a 50 μm thick aluminum oxide film was grown thereon. The surface of the sample was then lapped by 10 μm. The lapped surface had a roughness Ra=5 nm.

Using this sample, an experiment was performed as follows. The sample was placed in the electric furnace 601 and $N_2$ gas was supplied at a flow rate of 1 LSM into the furnace 601 via the line 602. The furnace temperature was raised at a rate of 2° C./min up to 200° C. The sample was maintained at 200° C. in a nitrogen atmosphere for 2 hours so that water contained in the sample was removed. The temperature was then decreased at a rate of 2° C./min down to 100° C. The temperature was maintained at 100° C. and the gas line was switched so that 5% $N_2/O_2$ gas was supplied at a total flow rate of 1 LSM into the electric furnace via the ozone generator. The output of the ozone generator was controlled so that the ozone concentration in the electric furnace was maintained at 10 g/cm³. Under the above conditions, the sample was subjected to heat treatment for 2 hours.

Figure 10:
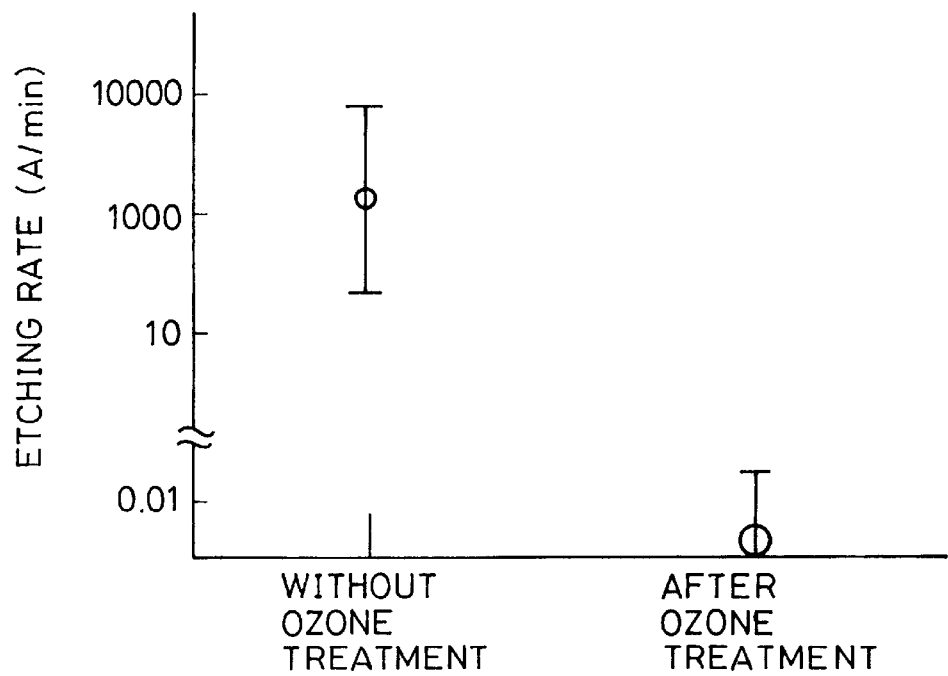
FIG. 10 is a graph illustrating the difference in etching rate between a sample subjected to ozone processing and a sample not subjected to ozone processing.

After the ozone treatment, the sample was soaked in a 1% $HF/H_2O$ solution (at 25° C.). FIG. 10 illustrates the etching rate at which the aluminum oxide film was etched in the above solution.

As can be seen from FIG. 10, the ozone treatment causes a great reduction in the etching rate of the aluminum oxide film. This means that the ozone treatment causes the aluminum oxide film to have stronger A—O bonds.

The sample was kept in ultrapure water for 100 days. Metals dissolved from the aluminum oxide film into the ultrapure water were evaluated by means of ICPMS. No metal dissolution was observed for the sample which had been subjected to ozone processing in an ambient containing 10 g/cm³ ozone at 200° C. for 2 hours.

It can be seen from the above result that an aluminum oxide film formed by anodic oxidation on an aluminum alloy can be improved in chemical resistance by further performing reprocessing on it in an oxidizing atmosphere.

Figure 11A:
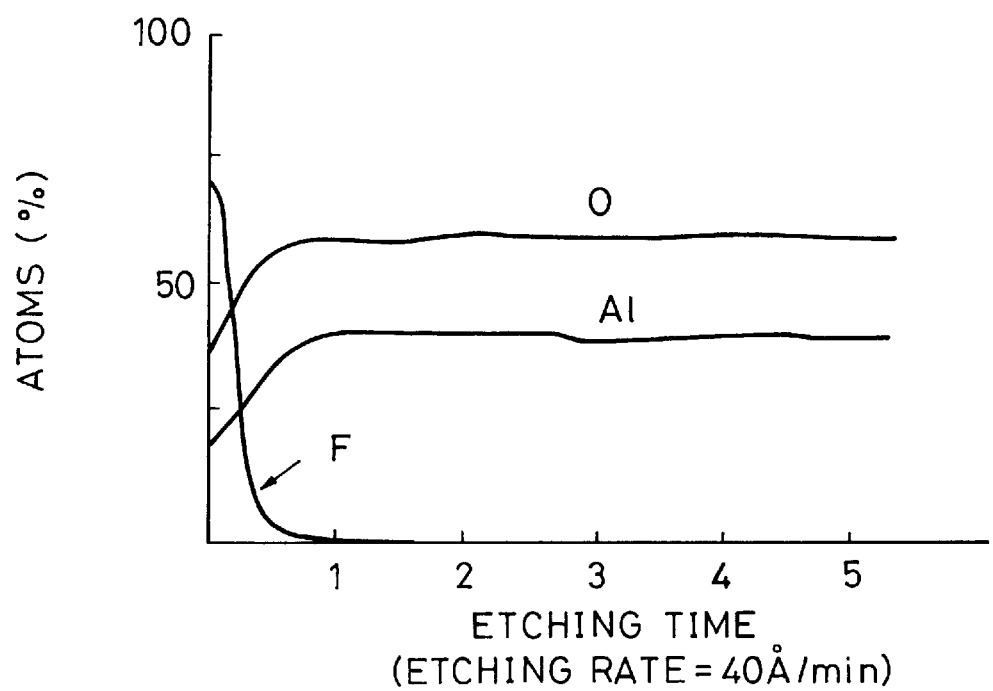
FIG. 11A is a graph illustrating a change in composition arising from plasma processing for Sample A5052 and FIG. 11B is a graph illustrating a change in composition arising from plasma processing for Sample MX534.
Figure 11B:
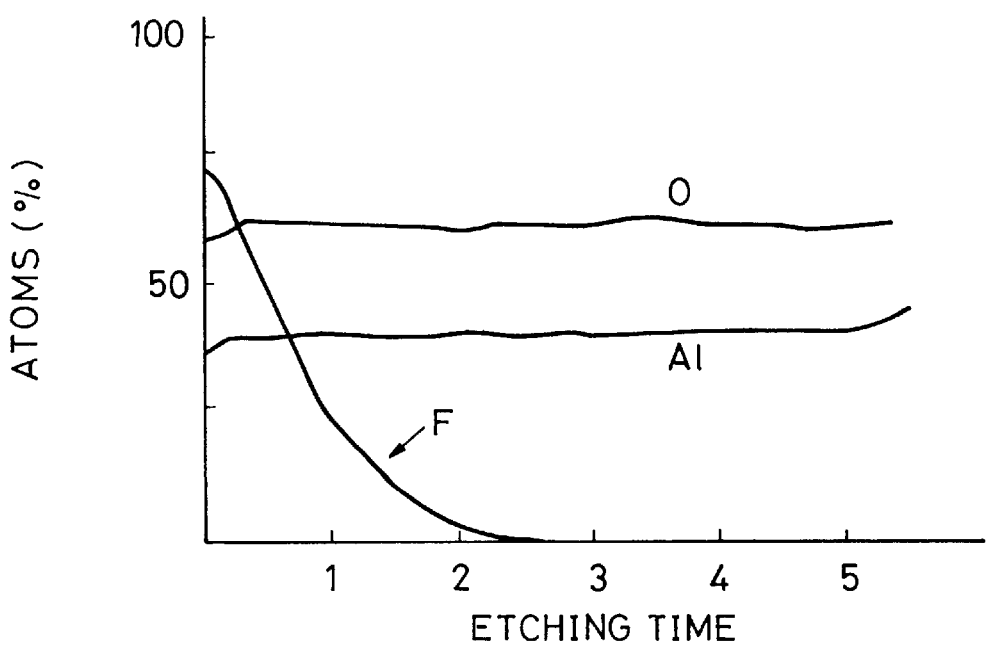

An aluminum oxide film was formed by anodic oxidation on a JIS A5052 aluminum alloy and also on an aluminum alloy provided from Mitsubishi Aluminum Co., Ltd. (MX534), and the film quality was evaluated for these two samples. The unintentional impurities of the JIS A5052 aluminum alloy were controlled so as to be of a low level less than 100 ppm. Lapping, cleaning, anodic oxidation, and densifying were performed under the same conditions for both samples. After that, heat treatment was performed at 100° C. for 2 hours thereby forming a high-quality aluminum oxide film on each aluminum alloy. These two samples were placed in a plasma processing apparatus (not shown) and were exposed to an $NF_3$ plasma. The above plasma processing was performed for 2 hours at 200° C. and at a gas pressure of 300 mTorr wherein the plasma was generated by 1 kW RF power at a frequency of 13.56 MHz. FIGS. 11A and 11B illustrates the chemical compositions of samples A5052 and MX534 respectively detected by XPS (X-ray photoelectron spectroscopy) before and after the plasma processing. From those figures it can be seen that the penetration depth of fluorine into the aluminum oxide film was about 10 nm for the sample A5052 and about 2 nm for the sample MX534. Although the cause of the above difference is not clear at present, the above result indicates that it is possible to improve the film quality by employing a high-purity material.

ALUMINUM FLUORIDE/MAGNESIUM FLUORIDE

A fluoride film including aluminum fluoride and magnesium fluoride serving as a fluorine passivation film used in an excimer laser generating system according to the present invention will now be described below.

In the present invention, an aluminum alloy is preferably used as a base material. More specifically, it is preferable to use an aluminum alloy containing magnesium as an additional element. The content of magnesium in the aluminum alloy is preferably in the range from 3% to 5% by weight.

If the magnesium content is less than 3%, the addition of magnesium is not enough to form a high-quality magnesium fluoride ($MgF_2$) film having a substantially stoichiometric composition and thus having high corrosion resistance. On the other hand, if the magnesium content is greater than 5%, an intermetallic compound is produced which causes degradation in workability such as malleability.

It is also desirable that one or more elements selected from the group consisting of Zr (0.05 to 0.15 wt %), B (0.05 to 0.15 wt %), and Ti (0.05 to 0.15 wt %) be further added.

The addition of these elements causes the crystal grains to become finer. The fine crystal grains allow atoms to diffuse via grain boundaries toward the surface, and thus it becomes possible to form a thick and dense fluoride film. If the content of an added element is less than 0.05% by weight, the above effects cannot be obtained. On the other hand, if the content is greater than 0.15% by weight, a compound of Zr, B, or Ti is precipitated, which results in poor workability. Of the above elements, Zr is particularly preferable because ZrF has a low boiling temperature and thus can be easily removed from the surface.

Mn, Si, Fe, Cu, Cr, Zn can be present as unintentional impurities in the aluminum alloy material. It is desirable that the content of any of these impurities be less than 0.05% by weight. If the content of some impurity is greater than 0.05% by weight or the total concentration of impurities is greater than 0.2% by weight, the impurities can form intermetallic compounds with magnesium or aluminum. Since the formation of an intermetallic compound consumes magnesium, it becomes difficult to form a fluoride passivation film. Furthermore, it is difficult to form a fluoride passivation film on an intermetallic compound. Even if a fluoride passivation film is formed, the resultant film will easily separate from the intermetallic compound.

As required, the aluminum alloy is subjected to proper preprocessing such as surface cleaning. After that, the aluminum alloy is baked to evaporate water and other contaminants thereby removing them. The baking is preferably performed at a temperature within the range from 150 to 450° C. If the baking temperature is lower than 150° C., the baking effects are not enough. On the other hand, if the baking temperature is higher than 450° C., the aluminum alloy can partially melt, which can cause creation of defects in the aluminum alloy. The baking is preferably performed for 1 to 5 hours.

The aluminum alloy is then subjected to fluorination processing. The fluorination processing is usually performed by exposing the surface of the aluminum alloy to elementary fluorine gas or a fluoride gas. In the fluorination processing, a proper catalysis may be used to enhance the reaction. The fluorination processing with the above gas is preferably performed at a temperature within the range from 150 to 450° C. If the temperature is lower than 150° C., the effects of the fluorination processing are not sufficient. On the other hand, if the temperature is higher than 450° C., ununiformity occurs in the quality of the fluoride passivation film. More preferably, the fluorination processing is performed at a temperature within the range from 200 to 450° C., and most preferably from 300 to 450° C. The fluorination processing is preferably performed for 1 to 6 hours.

The thickness of the fluoride passivation film increases with the temperature at which the fluorination processing is performed. When the fluorination processing temperature is equal, the thickness of the fluoride passivation film increases with the baking temperature. If heat treatment is performed after the fluorination processing, the fluoride passivation film becomes more dense in structure. This heat treatment is preferably performed at a temperature within the range from 150 to 450° C. and more preferably from 300 to 450° C. The preferable heat treatment time is within the range from 1 to 24 hours.

The fluoride passivation film may be formed by the above fluorination processing at least in a partial surface area of the aluminum alloy. The fluoride passivation film may be formed in a specific surface area or over the entire surface area of the aluminum alloy depending on the requirement of a specific application. In general, the thickness of the fluoride passivation film is preferably within the range from 20 to 500 nm. Although the corrosion resistance increases with the thickness of the fluoride passivation film formed on the aluminum alloy, a fluoride passivation film whose thickness is greater than 500 nm can separate from the aluminum alloy. Therefor it is desirable that the thickness be less than 500 nm. It is more preferable that the thickness be within the range from 100 to 200 nm.

During the fluorination processing and also during the baking performed as required, magnesium can diffuse in the aluminum alloy. As a result, a high concentration of magnesium is present near the surface of the aluminum alloy. The presence of Zr, B, or Ti causes the crystal grains to become finer and thus causes magnesium to diffuse more easily.

In the fluorination processing, the aluminum alloy reacts with fluorine or fluoride in contact with the surface of the aluminum alloy. In this reaction, the majority of a high concentration of magnesium present near the surface of the aluminum alloy is fluorinated. As a result, a fluoride passivation film containing magnesium fluoride is formed on the surface of the aluminum alloy.

The formation of the fluoride passivation film containing magnesium fluoride results in a reduction in the concentration of magnesium near the interface between the aluminum alloy and the fluoride passivation film. As a result, diffusion of magnesium from the inner part of the aluminum alloy toward the interface occurs, and magnesium supplied in this way allows the fluorination reaction to occur continuously. Thus, a fluoride passivation film containing $MgF_2$ as a main ingredient and a small amount of $AlF_3$ is formed. Since this fluoride passivation film contains $MgF_2$ as its main ingredient, it has excellent corrosion resistance. The aluminum alloy covered with this fluoride passivation film exhibits sufficiently high resistance to fluorine gas which is a highly corrosive gas.

Furthermore, the aluminum alloy covered with the above fluoride passivation film is also excellent in resistance to a hydrogen plasma. In the conventional excimer laser generating system, a small amount of water contained in gas can cause great degradation of the chamber, which results in a short life. The inventor of the present invention has found that discharging can cause the water in gas to change into a hydrogen plasma which can in turn cause defects on the inner wall of the chamber. However, the fluoride passivation film according to the present invention is excellent in resistance to a hydrogen plasma and thus it prevents the formation of defects on the inner wall of the chamber even if water is present in the gas.

IRON FLUORIDE

An iron fluoride film serving as a fluoride passivation film used in an excimer laser generating system according to the present invention will be described below.

In this embodiment of the invention, pure iron, stainless steel, or other iron compound may be used as a base material. It is not necessarily required that the entire base member be made of such iron alloy. For example, the base member may also be made of another kind of metal lined with pure iron or an iron compound.

As required, the iron alloy is subjected to proper preprocessing such as surface cleaning. After that, the iron alloy is baked to evaporate water and other contaminants thereby removing them. The baking is preferably performed at a temperature within the range from 150 to 450° C. The preferable baking time is within the range from 1 to 6 hours.

The iron alloy is then subjected to fluorination processing. The fluorination processing is usually performed by exposing the surface of the iron alloy to elementary fluorine gas or fluoride gas. In the fluorination processing, a proper catalyst may be used to enhance the reaction. The fluorination processing is preferably performed at a temperature within the range from 200 to 600° C., and more preferably from 300 to 600° C. If the temperature is lower than 200° C., the effects of the fluorination processing are not sufficient. On the other hand, if the temperature is higher than 600° C., ununiformity occurs in the quality of the fluoride passivation film. The fluorination processing is preferably performed for 1 to 6 hours. When the fluorination processing is performed at a high temperature, the resultant fluoride passivation film includes iron fluoride in the form of $FeF_3$ as its main ingredient. In contrast, the fluoride passivation film formed at a low temperature includes iron fluoride in the form of $FeF_2$ as its main ingredient. It is more preferable that the iron fluoride be in the form of $FeF_2$.

The thickness of the fluoride passivation film increases with the temperature at which the fluorination processing is performed. When the fluorination processing temperature is equal, the thickness of the fluoride passivation film increases with the baking temperature.

After the fluorination processing, heat treatment is preferably performed for 1 to 24 hours in an inert gas ambient such as $N_2$, Ar, or He. This heat treatment is preferably performed at a temperature within the range from 200 to 600° C. and more preferably from 300 to 600° C. The above heat treatment allows the fluoride passivation film to become more dense in structure.

The fluoride passivation film may be formed by the above fluorination processing at least in a partial surface area of the iron alloy. The fluoride passivation film may be formed in a specific surface area or over the entire surface area of the iron alloy depending on the requirement of a specific application. In general, the thickness of the fluoride passivation film is preferably within the range from 20 to 500 nm. Although the corrosion resistance increases with the thickness of the fluoride passivation film formed on the iron alloy, a fluoride passivation film whose thickness is greater than 500 nm can separate from the iron alloy and thus it is desirable that the thickness be less than 500 nm. It is more preferable that the thickness be within the range from 100 to 200 nm.

In the present invention, not only the inner wall of the laser chamber but also other parts which are in contact with $F_2$ gas are preferably covered with a fluoride film. That is, it is desirable that the surface of the blower and the inner wall of the stainless steel gas supply pipes be also be covered with a fluoride film containing iron fluoride.

When the heat exchanger is made of aluminum or an aluminum alloy, it be preferable that its surface is covered with a fluoride film containing aluminum fluoride. In this case, fluorination processing and heat treatment are performed on aluminum or aluminum alloy under the same conditions as those for the stainless steel except that the fluorination processing temperature and the heat treatment temperature are preferably within the range from 200 to 450° C. and more preferably from 300 to 450° C.

As described earlier, the conventional excimer laser generating system has the following problems. Firstly, $F_2$ should be supplied every $5\times10^6$ pulses to obtain specified optical output power.

Secondary, reaction produces a fluoride which absorbs laser light. This makes it impossible to obtain stable optical power. Therefore, it is necessary to replace the entire gas in the chamber with a new gas every $5\times10^7$ to $1\times10^8$ pulses.

Thirdly, some fluoride produced by chemical reaction deposits on a window of the laser chamber. As a result, it is required to replace the window every $1\times10^9$ pulses.

NICKEL FLUORIDE

Of the above three problems, the second and third problems can be avoided to a certain degree by forming a 20 to 30 nm fluoride passivation film thereby protecting the inner parts of the excimer laser generating system from corrosion by fluorine and also protecting the inner atmosphere from contaminations produced by corrosion.

However, the 20 to 30 nm fluoride passivation film cannot reduce the frequency of supplying $F_2$ gas to a sufficiently low level. Furthermore, it is still impossible to continuously use the laser chamber as long as $10^9$ pulses.

To avoid the above problems, in the present embodiment of the invention, the inner wall of the laser chamber of the excimer laser generating system is covered with a nickel fluoride film with a thickness greater than 100 nm.

In the present embodiment, the surface of the blower of the excimer laser generating system is covered with a nickel fluoride film.

In the present embodiment, the surface of the heat exchanger of the excimer-laser generating system is also covered with a nickel fluoride film.

Furthermore, the present invention provides a stepper (step-and-repeat exposure apparatus) including the above excimer laser generating system and a stage for carrying a substrate.

The thicknesses of these nickel fluoride films are preferably within the range from 100 to 200 nm.

It is rather easy to simply form an $NiF_2$ film having a thickness less than 50 nm. However, it is not easy to achieve a thickness greater than 50 nm. To avoid the above problem, the inner surface of the chamber is preferably plated with a nickel film containing phosphorus and then is subjected to heat treatment in a fluorine ambient thereby forming a nickel fluoride film having a thickness of 100 to 200 nm.

The method of forming an $NiF_2$ film according to the present invention will be described in further detail below.

Before forming a fluoride passivation film, a base material such as pure metal or an alloy is subjected to preprocessing so that a thin film composed of an alloy of nickel with another metal or semimetal such as phosphorus, boron, or tungsten. Then a fluoride passivation film is formed on the thin nickel alloy film. The presence of the metal or semimetal such as phosphorus, boron, or tungsten serving as an ingredient which constitutes together with nickel the thin nickel alloy film allows the film to be very stable. Besides, the above metal or semimetal contained in the thin nickel alloy film makes it possible to form a thick and stable fluoride passivation film.

During the process of forming the fluoride passivation film, nickel contained in the thin nickel alloy film reacts with fluorine, and the other ingredient of metal or semimetal such as phosphorus, boron or tungsten also reacts with fluorine wherein a volatile compound (fluoride) having a low boiling point is produced as a result of the reaction of the other ingredient of metal or semimetal such as phosphorus, boron, or tungsten with fluorine and the volatile compound immediately sublimates and thus it disappears. As a result, the other ingredient of metal or semimetal such as phosphorus, boron, or tungsten is not present at least at the surface of the fluoride passivation film. Therefore, the other ingredient of metal or semimetal does not results in any bad affection on production of semiconductor devices.

If the thin nickel alloy film composed of an alloy of nickel and another metal or semimetal is formed by means of electroless plating, it is possible to form a plated film with an uniform thickness even on the surface of a part having a very complicated shape or on the inner wall of pipes.

The base member on which a fluoride passivation film is to be formed may be made of any one of various materials including pure aluminum or aluminum alloys, pure titanium or titanium alloys, pure iron or iron alloys such as stainless steel, steel and steel alloys, and magnesium and magnesium alloy. The aluminum alloys which can be preferably used in the present invention include 2219, 5052, 5086, 6061, 6063, and 7N01. The titanium alloys include alloys containing 99.0% or more titanium (MIL T-9047B-1), Ti-6A1-4V (MIL T-9046B-2), and Ti-5A1-2.5 Sn (MIL T-9057B-2). Stainless steel materials include JISG4303 to 4312. Among these materials, aluminum and aluminum alloys are particularly suitable to be used in an excimer laser generating system chamber.

As described above, the base material is preferably subjected to preprocessing. When pure aluminum or an aluminum alloy is employed as a base material, the preprocessing is performed as follows. To remove an oxide film from the surface of the base material thereby making it possible to form an uniform underlying film thereon, the surface of the base material is degreased with a surface active agent or an organic solvent such as tetrachlorethylene, and then further degreased by soaking the base material in an acid or alkali solution without etching or with slightly etching by an amount of 0.1 $g/dm^2$ or less. If the base material is etched by an amount greater than 0.1 $g/dm^2$, unwanted pits are often generated at points where rather large precipitates are present. These pits can cause formation of unwanted microdefects in a thin film of a nickel alloy such as nickel-phosphorus alloy or in a fluoride passivation film which will be formed later.

Since the surface of the base material of aluminum or aluminum alloy is very active after being degreased, it is difficult to perform plating directly on it. To avoid the above problem, the base material is soaked in an aqueous solution of alkali sodium zincate thereby performing zincate conversion process. After performing the above zincate conversion process once, if the base material is soaked in a 50% $HNO_3$ solution maintained at room temperature for 30 sec thereby degreasing the base material, and zincate conversion process is performed again, then it is possible to obtain a denser film having good adhesion to the underlying material. This method is known as the double zincate conversion process.

In the case where titanium or a titanium alloy is employed as the base material, the preprocessing is performed in the manner described below to avoid the difficulty arising from the fact that the surface of titanium or titanium alloy is a very active and thus it is difficult to perform plating directly on it. First, the surface of the base material is sandblasted by means of a mechanical method such as shot blast. The surface of the base material is then etched using a mixture of nitric acid and hydrofluoric acid. After that, the surface of the base material is activated using a mixture of dichromic acid and hydrofluoric acid. The above preprocessing allows the base material to be coated with a denser film having better adhesion.

The preprocessing for the stainless steel base material is performed as follows. First, alkali degreasing is performed. Then the base material is etched using hydrochloric acid thereby activating the surface thereof. To improve the adhesion, strike nickel plating is performed in a Watt bath.

A thin film of an alloy of nickel and another kind of metal or semimetal is then formed on the base material. As a specific example, a process of forming a thin nickel-phosphorus alloy film on the surface of aluminum or aluminum alloy serving as the base metal by means of electroless plating will be described below.

After performing preprocessing on the surface of the base material, nickel-phosphorus electroless plating is performed by immersing the bare material in an aqueous solution containing a metallic salt of $NiSO_4$ (nickel sulfate) as a main ingredient, $NaH_2PO_2$ (sodium hypophosphite) serving as a reducing agent, an organic acid (complexing agent) serving as an auxiliary agent, and a stabilizing agent. In electroless plating, metal is deposited by means of a chemical reducing agent without electrical current. Therefore, it is possible to form a nickel-phosphorus film with a uniform thickness on the inner surface of pipes or the inner surface of a chamber having a complicated shape. In electro-plating, on the contrary, the thickness of the deposited metal varies depending on the shape of the base material and also on the position of the electrode. For example, electric current is concentrated on sharp corner portions while the electric current density becomes low in flat surface areas. Therefore, even if an auxiliary electrode is employed, thickness difference occurs due to the difference in the electric current density. Thus, it is not unusual that the maximum thickness of the plated film is ten times greater than the minimum thickness. With the electroless plating, on the other hand, it is possible to achieve good thickness uniformity with a variation less than ±5% by stirring or circulating the solution.

Furthermore, in the electroless plating of a nickel-phosphorus film, the presence of phosphorus makes it possible to deposit a film (nickel-phosphorus film) in a very stable fashion.

In practice, the electroless-plated nickel-phosphorus film serving as the underlying layer is preferably formed in such a manner as to have a thickness greater than about 1 $\mu$m and more preferably greater than 2 $\mu$m. When a nickel-phosphorus film is deposited by means of electroless plating with $NaH_2PO_2$ serving as a reducing agent, the resultant film has a eutectic composition containing 1% or greater by weight phosphorus. This causes the deposited film to have a hardness (Vickers' hardness) as high as 500 to 600 (Hmv).

In contrast, films deposited by means of common electro-plating have a hardness in the range from 150 to 250 (Hmv). This means that the films deposited by means of electroless plating are superior in resistance to wear or resistance to mechanical damage to those deposited by means of electro-plating.

Although the electro-plating has some drawbacks as described above, this technique may still be employed to deposit a thin nickel-phosphorus film. Alternatively, dry processing may also be employed instead of wet processing. Examples of dry processing include physical vapor deposition (PVD) such as sputtering and ion plating, thermal vapor deposition, and chemical vapor deposition (CVD) such as plasma evaporation.

In addition to nickel-phosphorus alloy, alloys of nickel and another kind of metal or semimetal which may be employed in the present invention include nickel-boron, nickel-tungsten, or the like.

In the present invention, it is preferable that a Ni-W-P film having a single-phase composition containing 5% or less by weight of W and 9% or greater by weight of P be first deposited by means of plating and then the film be fluorinated. More preferably, the tungsten content is within the range from 0.5 to 2wt % and the phosphorus content is within the range from 10 to 13.5 wt %.

In this way, the underlying layer is formed. The above preprocessing for forming the underlying layer is essentially important to obtain a uniform fluoride passivation film.

In this embodiment, the base material on which the underlying layer has been formed by the above preprocessing is then etched in an etching solution such as a 1% HF aqueous solution for 1 min. The base material is then cleaned with water. After drying the base material, it is baked in an ambient of an inert gas such as $N_2$. Thus the contaminants present on the surface and gas present in the inner part of the base material are removed. Then fluorination processing is performed on the base material so that a fluoride passivation film composed of a metal fluoride ($NiF_2$) is formed on the surface of the base material. The base material is then subjected again to heat treatment in an inert gas ambient. In the above processing, the fluorination is preferably performed by exposing the base material to 100% $F_2$ gas or $F_2$ gas containing 0.1 vol ppm water at a normal pressure or at a gauge pressure less than 2 atm.

The baking is preferably performed for 1 to 5 hours at a temperature in the range from 200 to 390° C. and more preferably from 250 to 350° C. The subsequent fluorination processing is preferably performed for 1 to 5 hours at a temperature in the range from 200 to 390° C. and more preferably from 250 to 390° C. The heat treatment after the fluorination processing is preferably performed for 1 to 5 hours at a temperature in the range from 250 to 390° C. and more preferably from 330 to 380° C. in an ambient of inert gas such as $N_2$, Ar, or He so that a fluoride passivation film, which is hard and dense and also excellent in resistance to a corrosive gas, is formed on the base material of metal or the like.

In the present embodiment, since the fluoride passivation film is formed on the electroless-plated nickel-phosphorus film, the phosphorus contained in the electroless-plated nickel-phosphorus film makes it possible to form a fluoride passivation film having a thickness as great as 100 nm or even greater. This allows a great increase in the life of the chamber. More preferably, the fluoride passivation film is formed in such a manner as to have a thickness in the range from 100 to 200 nm. In any case, the fluoride passivation film has sufficiently strong adhesion to the base material so that it does not easily separate from the base material.

In the present embodiment, as described above, before forming the fluoride passivation film, the base material is subjected to the preprocessing including the degreasing, the cleaning, the zincate conversion process, and the electroless nickel-phosphorus plating. This makes it possible to form an underlying film more uniformly than can be achieved by another means such as electro-plating or vapor deposition. As a result, it becomes possible to uniformly form a fluoride passivation film, which results in a great improvement in resistance to a corrosive gas. In the present embodiment, as described above, although no phosphorus is present at the surface of the fluoride passivation film, the inner part of the fluoride passivation film includes phosphorus whose concentration increases with the depth into the film.

Figure 12B:
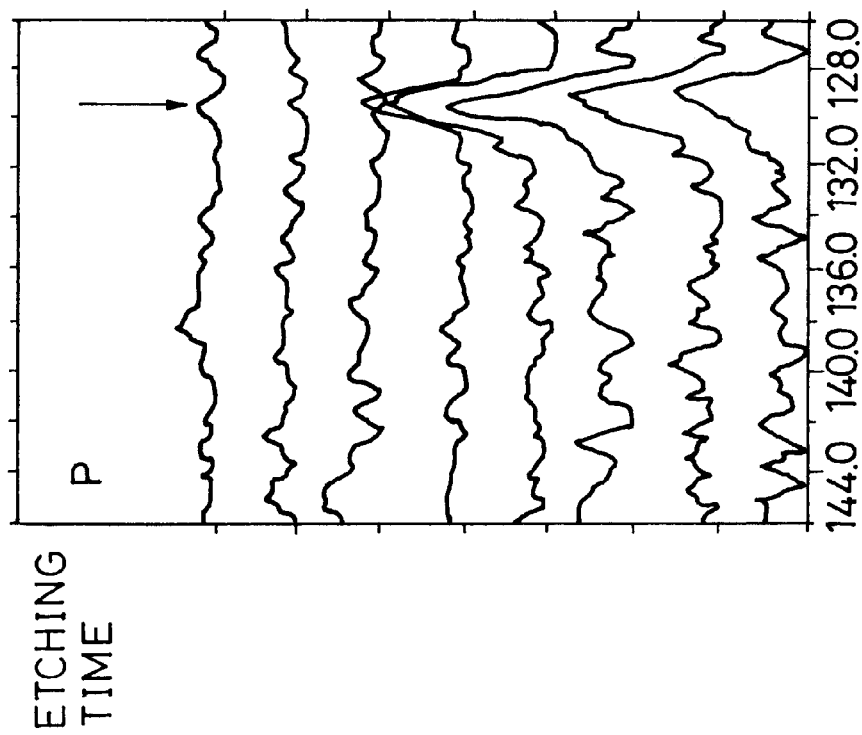
FIG. 12(B) is a graph illustrating phosphorus distributions.
Figure 12A:
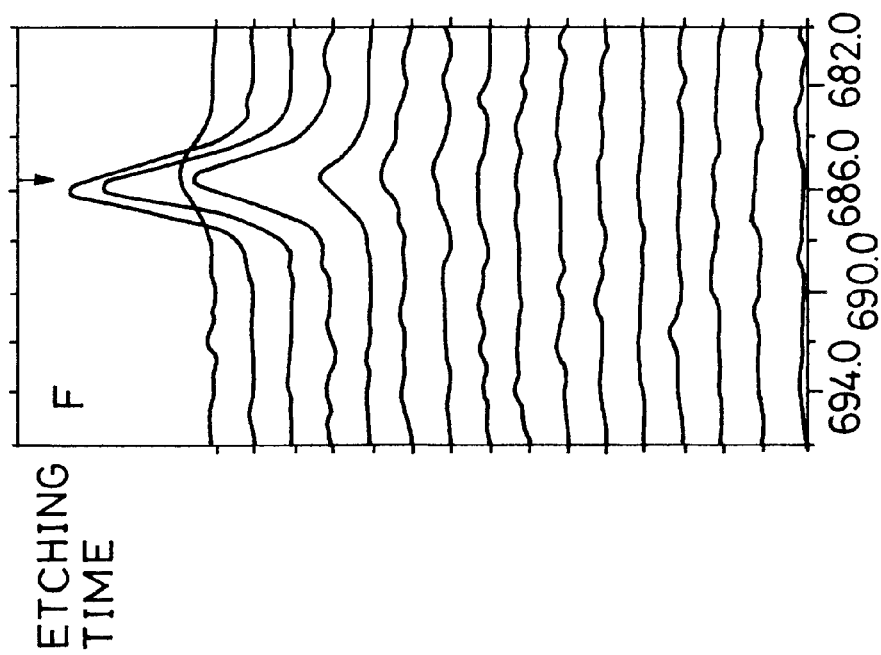
FIG. 12(A) is a graph illustrating fluorine distributions.

FIG. 12 illustrates the distributions of fluorine and phosphorus at the surface and also at some depths into the fluoride passivation film, measured by ESCA (electron spectroscopy for chemical analysis) wherein the fluorine distribution is shown in FIG. 12(A) and the phosphorus distribution is shown in FIG. 12(B).

In FIGS. 12(A) and 12(B), the vertical axes represent the etching time (min) with respect to the surface of the fluoride passivation film, while the horizontal axes represent bond energy wherein each element has its own specific bond energy. If a maximum appears in a short-etching-time region, it can be concluded that an element corresponding to that maximum is present near the surface. On the other hand, if a maximum appears after etching the film a considerably long time, then it can be concluded that the element does not exist near the surface but exists only in the inner part of the film.

As can be seen from FIG. 12(A), fluorine (F) is present only at and near the surface of the fluoride passivation film and no fluorine is observed in the inner part of the film. On the other hand, as can be seen from FIG. 12(B), no phosphorus is present either at or near the surface of the fluoride passivation film but phosphorus is present in the inner part of the film wherein its concentration increases with the depth into the film.

Figure 13:
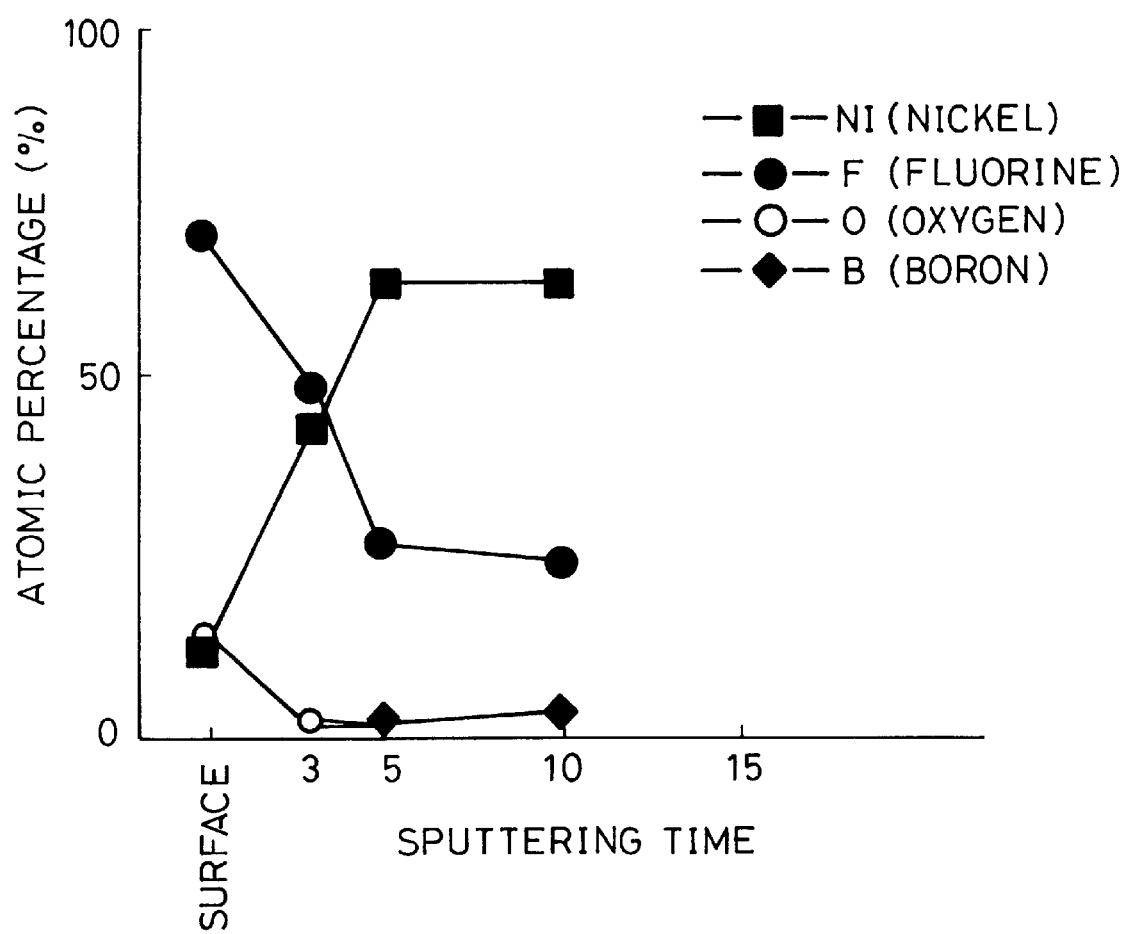
FIG. 13 is a graph illustrating fluorine and boron concentration profiles.

FIG. 13 illustrates the distributions of fluorine and boron from the surface into inner parts of a fluoride passivation film which was formed on a plated nickel-boron alloy film serving as the nickel alloy film according to the invention, formed instead of the nickel-phosphorus alloy film on the base material, wherein the distributions were also measured by means of ESCA. In FIG. 13, the distribution of oxygen measured by ESCA is also shown.

As can be seen from FIG. 13, although a high concentration of fluorine (F) is present at and near the surface of the fluoride passivation film, the concentration decreases with the depth into the film. On the other hand, boron (B) is not preset either at or near the surface of the fluoride passivation film, but is present in the inner part of the film wherein its concentration increases with the depth into the film.

Figure 14:
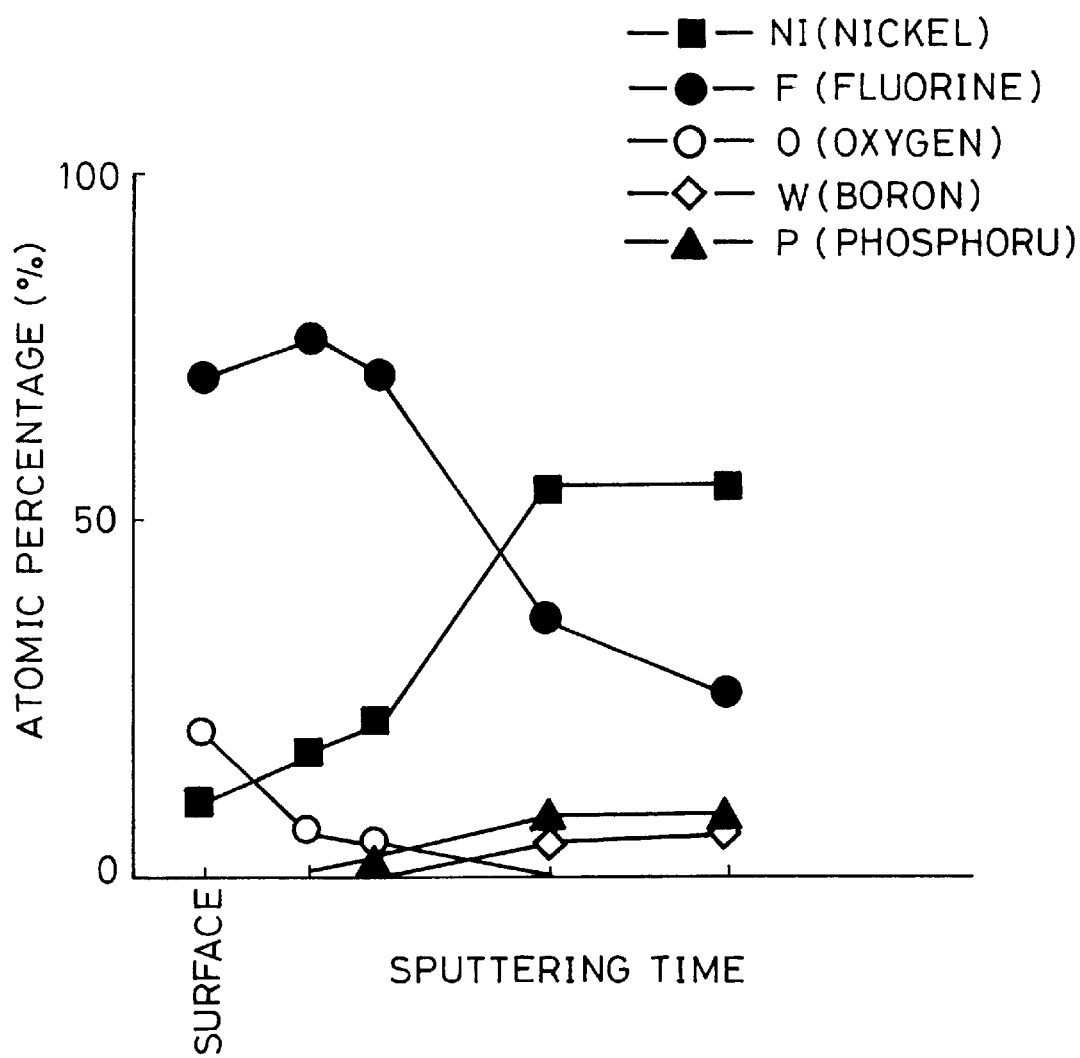
FIG. 14 is a graph illustrating fluorine, tungsten, and phosphorus concentration profiles.

FIG. 14 illustrates the concentration profiles of fluorine, tungsten, and phosphorus measured inward from the surface of a fluoride passivation film which was formed on a plated nickel-tungsten-phosphorus alloy film formed instead of the nickel-phosphorus alloy film on the base material, wherein the distributions were also measured by means of ESCA. In FIG. 14, the concentration profiles of nickel and oxygen measured by ESCA are also shown.

As can be seen from FIG. 14, although a high concentration of fluorine (F) is present at and near the surface of the fluoride passivation film, the concentration decreases with the depth into the film. On the other hand, boron (B) is not preset either at or near the surface of the fluoride passivation film, but is present in the inner part of the film wherein its concentration increases with the depth into the film.

FIG. 15(A) illustrates the composition profile of a metal fluoride ($NiF_2$) film which was formed not on an alloy of nickel and another kind of metal or semimetal which can form a volatile fluoride compound but directly on a pure nickel film formed on a base material. As can be seen from FIG. 15(A), the fluorine content decreases with the depth into the film represented by the sputtering time in FIG. 15(A). The fluorine content drops to as low a level as about 11% where no fluorine is present in a practical sense.

On the other hand, FIG. 15(B) illustrates the composition profile of a metal fluoride film formed on a nickel-phosphorus film containing 8% of phosphorus and serving as the above-described alloy of nickel and another kind of metal or semimetal which can form a volatile fluoride compound, wherein the nickel-phosphorus film was previously formed on a base material before the formation of the metal fluoride film. As can be seen from FIG. 15(B), the film contains as high a concentration as 29% of fluorine even at a considerably deep location wherein the depth is represented by the sputtering time in FIG. 15(B).

It can be concluded from FIGS. 15(A) and 15(B) that if a thin film composed of an alloy of nickel and another kind of metal or semimetal which can form a volatile fluoride is formed on the base metal and then the film is fluorinated, the resultant metal fluoride layer has a large thickness.

The inventor of the present invention has also performed an experiment to investigate the resistance to corrosive gases. In the experiment, after performing the above-described preprocessing, a fluoride passivation film was formed on base members of aluminum or an aluminum alloy. In this way, samples were prepared. The samples were kept in a 5 vol % HF+1 vol % $H_2O$+94 vol % $N_2$ gas ambient for 72 hours or in a $Cl_2$ gas ambient at a gauge pressure of 2 kg/cm$^2$ for 7 days. The surfaces of the samples were then observed via an electron microscope. No corrosion was observed in any sample, and thus it has been found that the fluoride passivation film has excellent resistance to corrosive gases.

Another sample was kept in 100° C. wet gas ambient of 1 vol % $H_2O$+99 vol % $Cl_2$ for 30 days. Also in this case, no corrosion was observed. This means that the fluoride passivation film has excellent resistance to a variety of corrosive gases.

The result of the above experiment as well as the result of other experiments are listed in Table 1.

TABLE 1

| TEST ITEM | TEST CONDITION | RESULT |
| --- | --- | --- |
| CORROSION RESISTANCE TO CHLORINE GAS | EXPOSED TO $Cl_2$ FOR 7 DAYS | NO CHANGE(*) |
| CORROSION RESISTANCE TO WET CHLORINE GAS | EXPOSED TO 99 VOL % $Cl_2$ + 1 VOL % $H_2O$ AT 100° C. FOR 30 DAYS | NO CHANGE(*) |
| CORROSION RESISTANCE TO A MIXED GAS OF HF | EXPOSED TO 5 VOL % HF + 94 VOL % $N_2$ + 1 VOL % $H_2O$ AT ROOM TEMPERATURE FOR 72 HOURS | NO CHANGE(*) |
| CORROSION RESISTANCE TO SATURATED HYDROCHLORIC ACID VAPOR | EXPOSED TO SATURATED VAPOR OF 12N-HCl FOR 1 HOUR | NO CHANGE(*) |
| CORROSION RESISTANCE TO SULFURIC ACID | EXPOSED TO 20 VOL % $H_2SO_4$ AT ROOM TEMPERATURE FOR 74 HOURS | NO CHANGE(*) |
| CORROSION RESISTANCE TO GALLIUM | EXPOSED TO METALLIC GALLIUM MELT AT 60° C. FOR 5 MIN | NO CHANGE(*) |
| CORROSION RESISTANCE TO WATER | AFTER BEING IMMERSED IN DEIONIZED WATER AT ROOM TEMPERATURE FOR 100 HOURS, F AND Ni IN WATER WERE ANALYZED | NO DIS- SOLUTION ON WAS OBSERVED |

*NOTE: Evaluation was performed on the basis of the changes detected by means of direct inspection and via a microscope.

As can be seen from the above discussion, if elements of an excimer laser generating system are made up of a metal material covered with a fluoride passivation film, the corrosion of these elements can be prevented. Furthermore, it is also possible to prevent the ambient from being contaminated by the corrosion. As a result, it becomes possible to achieve a high-precision excimer laser generating system having high reliability.

In a more preferable mode, the filter is also coated with a nickel fluoride film formed in the above-described manner.

Various fluoride films are also disclosed for example in Japanese Unexamined Patent Publication No. 3-215656 (1991).

In the gas supplying system for supplying a gas to the laser chamber, according to the present invention, at least those parts of the gas supplying system which are in direct contact with $F_2$ gas are preferably covered with a fluoride passivation film. The fluoride passivation film formed by the fluorination processing serves to prevent the adsorption of water. Even if water is adsorbed on its surface, it is possible to easily purge and remove the water in a short time.

Furthermore, the fluoride passivation film causes a reduction in outgassing, and thus makes it possible to keep a high-purity ambient. Therefore, unwanted consumption of supplied $F_2$ gas does not occur and it is possible to precisely supply a required amount of $F_2$ gas into the laser chamber so that the chamber is filled with a desired pressure of discharging gas. As a result, good reproducibility is achieved in the laser output power. Furthermore, it also becomes possible to quickly start the operation of the excimer laser generating system.

In addition to the parts in contact with $F_2$ gas, it is desirable that other parts inside the gas supply system such as the valves and the manifold also be subjected to the fluorination processing for the same reason.

For such the parts, fluorination processing may be performed in a similar manner to that for the laser chamber. For pipes, a fluoride film may be formed by passing $F_2$ gas through the pipes while heating them.

Figure 16:
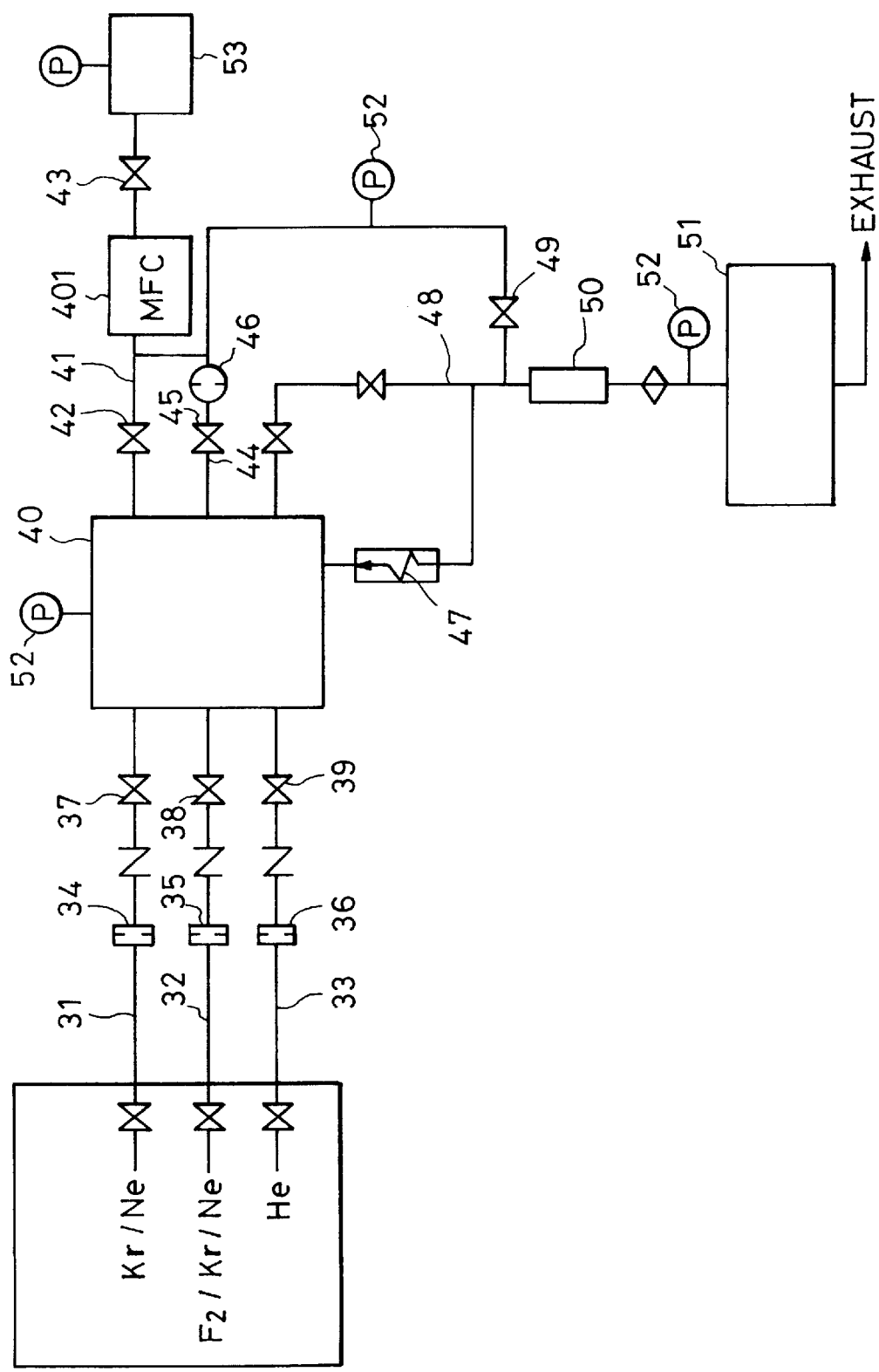
FIG. 16 is a schematic diagram of an embodiment of a gas supply system for supply gas into a laser chamber according to the present invention.

FIG. 16 illustrates an embodiment of a gas supply system for supplying a gas into a laser chamber of an excimer laser generating system according to the present invention.

The feature of the gas supply system shown in FIG. 16 is that a flow meter 401 is provided in the middle of a connection pipe 41 between a manifold 40 and a chamber 53. The other parts are similar to those in FIG. 3 and denoted by similar reference numerals. Preferably, a mass flow controller capable of precisely controlling the flow rate of gas to a desired value is employed as the flow meter 401.

With the gas supply system shown in FIG. 16, a laser gas is supplied into the laser chamber as follows. First, the mass flow controller is set to a proper flow rate and 1% $F_2$/1% Kr/Ne gas is supplied into the chamber via the mass flow controller for a predetermined time. Similarly, the mass flow controller is set to a proper flow rate and 1% Kr/Ne gas is supplied into the chamber via the mass flow controller for a predetermined time. The amount of each gas supplied into the laser chamber is given by the product of the gas flow rate and the supplying time.

With the above method, it is possible to fill the laser chamber with mixed gas of 1% $F_2$/1% Kr/Ne and 1% Kr/Ne with a precise ratio.

Figure 17:
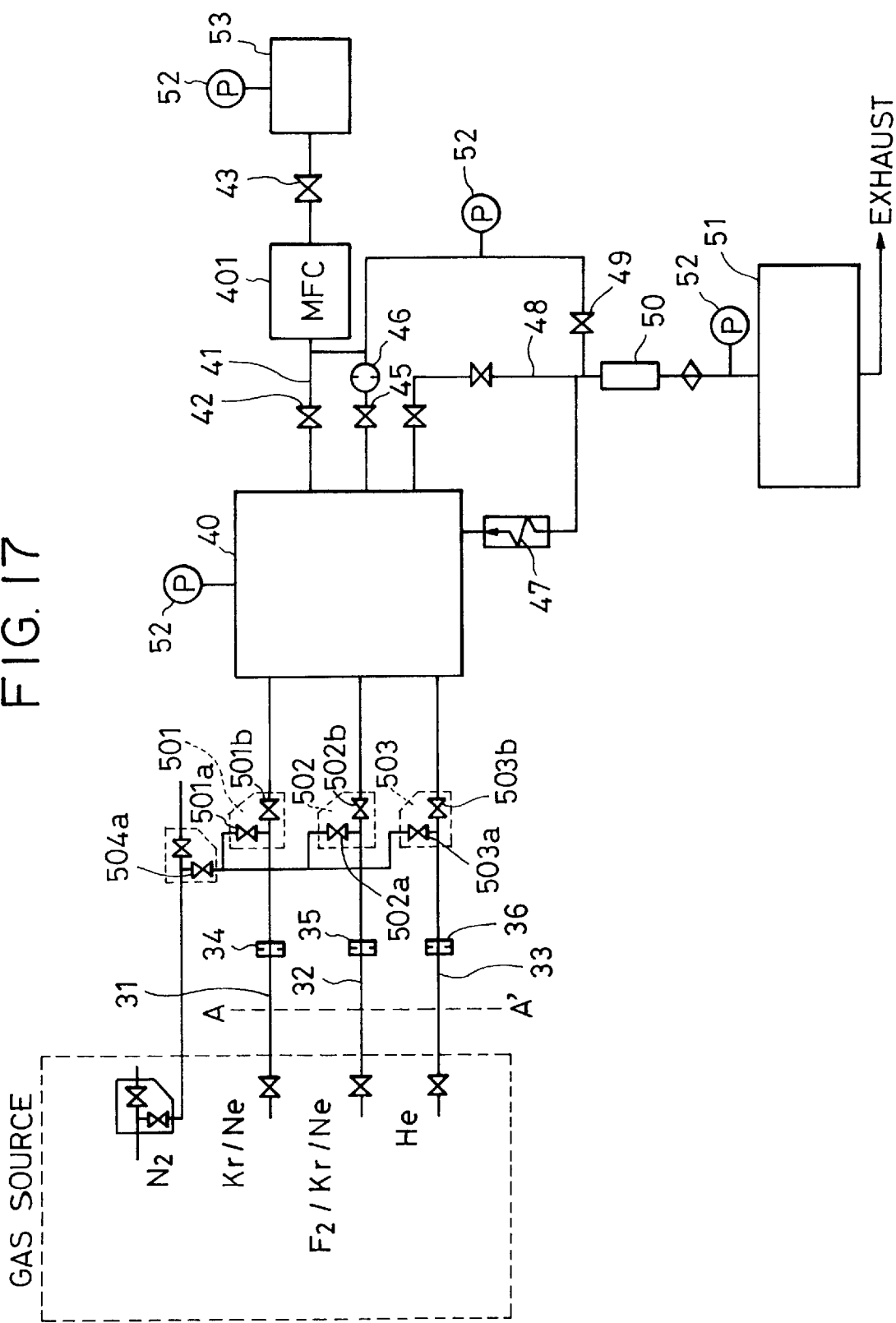
FIG. 17 is a schematic diagram of another embodiment of a gas supply system for supply gas into a laser chamber according to the present invention.

FIG. 17 illustrates another embodiment of a gas supply system for supplying gas into a laser chamber of an excimer laser generating system according to the present invention.

Figure 3:
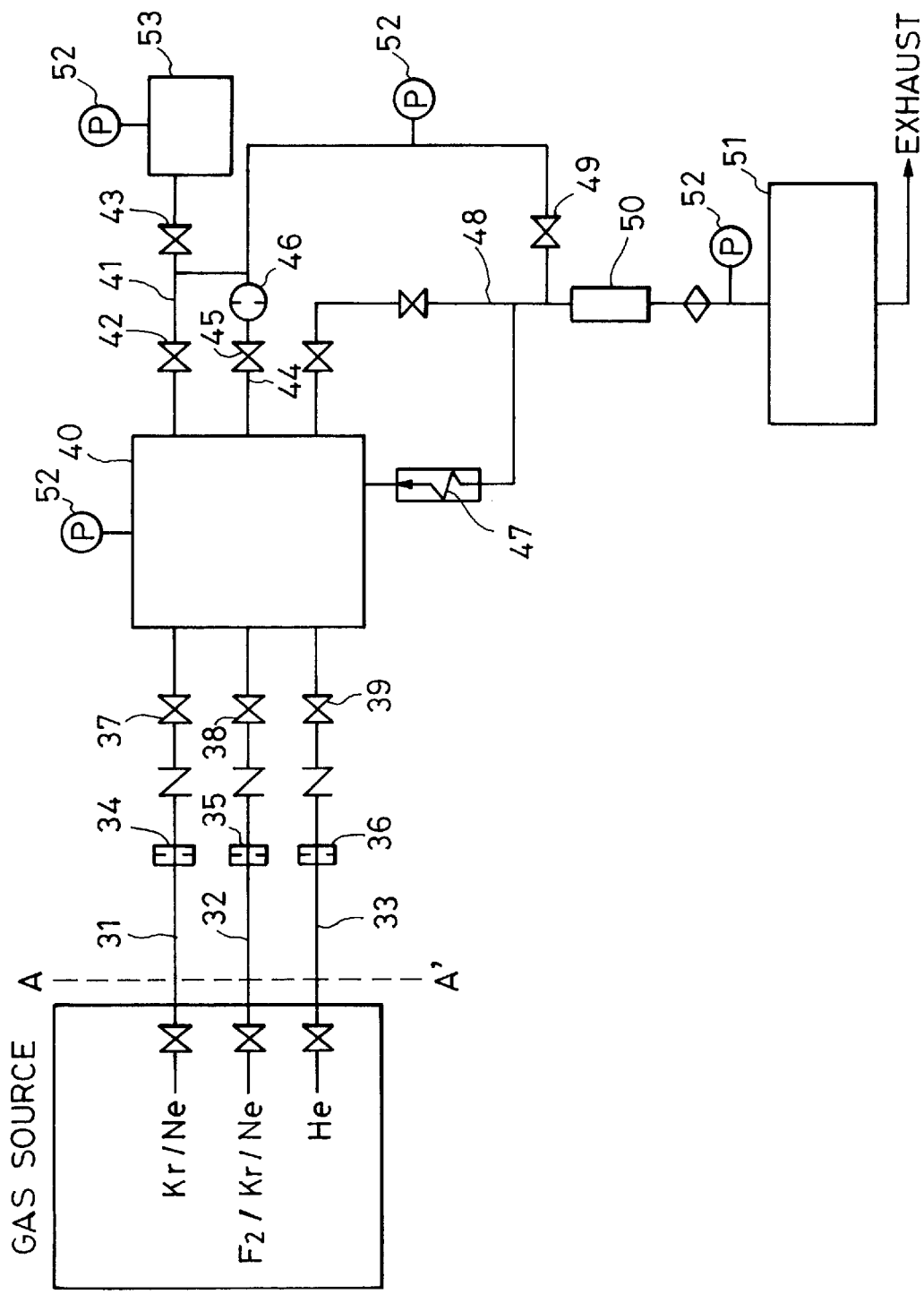
FIG. 3 is a schematic diagram of a system for supplying gas into a laser chamber.

In the case of the gas supply system shown in FIG. 3, when for example a gas source is replaced, the gas source is disconnected from the corresponding gas pipe by removing a connector (not shown) located at line A–A' in FIG. 3. During the replacement process, the inside of the gas supply pipe is exposed to atmosphere and the inner wall of the pipe adsorbs impurities such as water. In the operation after the gas source replacement, the impurities such as water react with $F_2$ gas passing through the pipe and the $F_2$ is partly consumed by this reaction. This results in deviation in the amount of $F_2$ gas from the set value, which causes poor reproducibility in the laser output power. Since even a small amount of impurity can cause a bad affection, it is required to perform an outgassing process for a long time so as to remove the impurity to a sufficiently low level.

On the other hand, in the gas supply system according to the present invention, as shown in FIG. 17, an inert gas purging system is provided in gas supply pipes. In the specific example shown in FIG. 17, the purging system includes three-way valves 501, 502, and 503 each composed of two valves wherein one valve of each three-way valve is connected to an inert gas source.

Gas sources can be replaced as follows. First, the valves 501b, 502b, and 503b are closed and the valves 501a, 502a, and 503a are opened. Then the valve 504a is opened so that high-purity $N_2$ gas is introduced into the gas supply pipes. Then the gas sources are disconnected from the gas supply pipes at the connectors (not shown) located along line A–A', and new gas sources are connected to the gas supply pipes. During the replacing operation, $N_2$ gas is supplied from the $N_2$ supply line to the above gas supply pipes so that $N_2$ gas always blows out from the pipes thereby preventing the inside of the gas supply pipes from being contaminated with atmosphere. After connecting the new gas sources to the gas supply pipes, the valves 501a, 502a, and 503a are closed and then the valve 504a is closed. Then the valves 501b, 502b, and 503b are opened and the inside of the pipes is evacuated by a vacuum pump 51 via the manifold 40.

After that, 1% $F_2$/1% Kr/Ne and 1% Kr/Ne are supplied into the laser chamber in the manner described above so that the laser chamber is filled with these gases with a predetermined ratio.

Although not shown in FIG. 17, it is desirable that a similar purging system is also provided on the gas source side so that an inert gas is passed through the gas lines directly connected to the gas sources thereby preventing the gas sources from being contaminated with atmosphere during the replacing operation.

With the above arrangement, it is possible to obtain stable laser output power even immediately after the replacement of the gas sources.

As for the purging inert gas, $N_2$, Ar, or He may be employed. It is desirable that the concentrations of impurities in the inert gas be less than 10 ppb.

The invention will be described in further detail below with reference to specific examples.

EXAMPLE 1

In this example, the procedure of forming an aluminum oxide film serving as a fluoride passivation film on the inner wall of the laser chamber shown in FIG. 4 will be described.

An aluminum alloy with the following composition was employed as a base material.

Mg: 3.5% by weight

Zr: 0.1% by weight

Other unintentional impurities: 90 ppm

Al: the other part

The above base material was lapped to a surface roughness Ra=0.01 $\mu$m.

After the lapping, the base material was soaked in a solution of 70% $HNO_3+H_2O$ for 30 min so that surface contaminants were entirely removed.

After the removal of the surface contaminants, anodic oxidation was perform so that an aluminum oxide film with a thickness of 50 $\mu$m was grown on the base material. Then the base material was subjected to a densifying process at 200° C. in an oxidizing ambient. The surface of the aluminum oxide film was then lapped by 10 $\mu$m so that the remaining aluminum oxide film had a thickness of 40 $\mu$m and had a surface roughness Ra=5 nm.

In this way, housing members 13 and 14 were produced.

After that, a heat exchanger 24, a blower 23, electrodes 18 and 19, and other elements were set in the right places thereby producing a laser chamber 1 having the structure shown in FIG. 4. In this example, the heat exchanger 24 was made up of an electro-polished JIS5052 material and the blower 23 was made up of an electro-polished SUS316L material.

Figure 1:
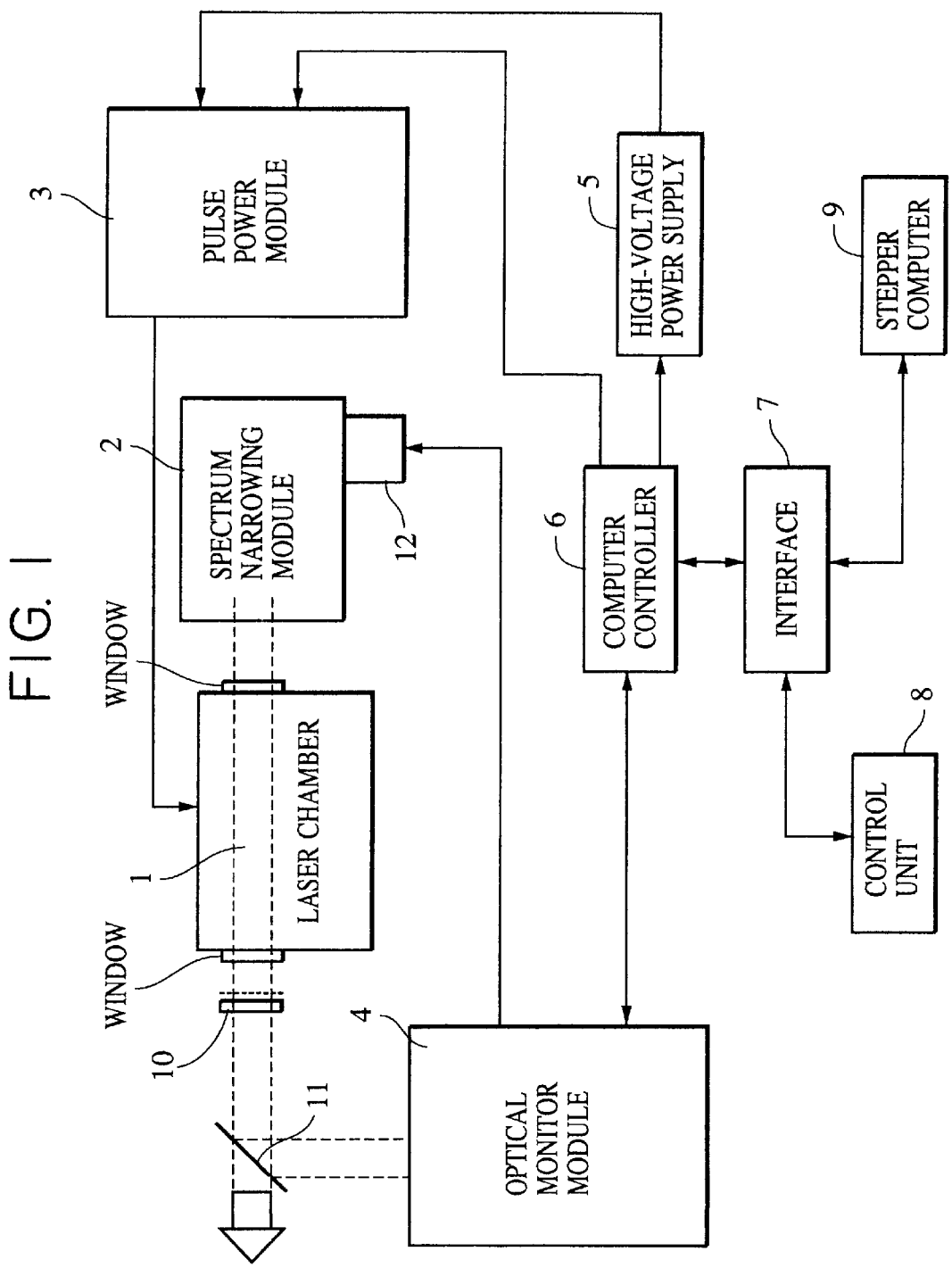
FIG. 1 is a block diagram illustrating an excimer laser generating system.

This laser chamber was assembled into a system similar to that shown in FIG. 1, and $F_2$, Kr, and Ne were supplied from the gas supply system shown in FIG. 3 into the laser chamber so as to fill the laser chamber with these gases.

The obtained excimer laser generating system was evaluated in terms of the following characteristics.

GAS SUPPLYING FREQUENCY

With the optical monitor module 4 shown in FIG. 1, the laser output power was measured for each pulse and the number of pulses was counted until the laser output power fell down to a level lower than the allowable minimum value and thus a supply of fluorine gas was required.

In this specific example, the counted number of pulses was $8\times10^6$.

STABILITY OF DISCHARGING

With the optical monitor module 4 shown in FIG. 1, the energy and shape of each pulse were measured, and the number of pulses was counted until the variations in the pulse energy and shape had finally reached 5%.

In this specific example, the number of pulses was $5\times10^8$.

LIFE OF THE EXCIMER LASER GENERATOR

The life of the excimer laser generating system was evaluated by counting the number of pulses which could be generated before the laser chamber became so degraded that the replacement was required.

The evaluated life was $5\times10^9$ pulses.

EXAMPLE 2

In this second example, the blower 23 in the laser chamber was made up of the same aluminum alloy as that employed to form the housing members in the first example, and an aluminum oxide film was formed on the surface of the blower 23 in a similar manner employed for the housing members in the first example.

The other parts were the same as those in the first example.

Under the same conditions as in the first example, the aluminum oxide was formed to a thickness of 50 $\mu$m.

The obtained excimer laser generating system was then evaluated in a similar manner to the first example. The result is shown below.

Gas supplying frequency: once every $1.6\times10^7$ pulses

Discharging stability: $5\times10^8$

Life: $5\times10^9$

EXAMPLE 3

In this third example, the heat exchanger was made up of the same aluminum alloy material covered with a fluoride passivation film as that employed to form the housing member in the first example.

The other parts were the same as those in the first example and thus the blower was made up of an electro-polished SUS316L material.

Under the same conditions as in the first example, the fluoride passivation film was formed to a thickness of 100 nm.

The obtained excimer laser generating system was then evaluated in a similar manner to the first example. The result is shown below.

Gas supplying frequency: once every $2.4\times10^7$ pulses

Discharging stability: $6\times10^8$ pulses

Life: $5\times10^9$ pulses

EXAMPLE 4

In this fourth example, the inner wall of the chamber, the surface of the blower, and the surface of the heat exchanger were all covered with an aluminum oxide film serving as a fluoride passivation film.

The obtained excimer laser generating system was then evaluated in a similar manner to the first example. The result is shown below.

Gas supplying frequency: once every $4\times10^7$ pulses
Discharging stability: $6\times10^8$ pulses
Life: $5\times10^9$ pulses In this fourth example, as the main parts were all covered with the fluoride passivation film of aluminum oxide, great improvements were achieved in the gas supplying frequency, the discharging stability, and the life compared to those achieved in the first through third examples.

EXAMPLE 5

In this fifth example, an aluminum oxide film was formed in two different ways: (1) the aluminum oxide film was formed only on the surface of the blower (the inner surface of the laser chamber and the surface of the heat exchanger had no aluminum oxide film after being electro-polished); and (2) the aluminum oxide film was formed only on the surface of the heat exchanger (the inner surface of the laser chamber and the surface of the blower had no aluminum oxide film after being electro-polished). The evaluated gas supply frequency was once every $6.4\times10^6$ for the case (1) and $7\times10^6$ for the case (2).

EXAMPLE 6

In this sixth example, as in the first example, after lapping the surface of an aluminum alloy base material, contaminants were removed from the surface. Then an aluminum oxide film with a thickness of 50 $\mu$m was formed by means of anodic oxidation on the clean surface of the aluminum alloy.

The surface of the aluminum oxide film was lapped by 10 $\mu$m so as to obtain a surface roughness Ra=5 nm.

After lapping the surface by 10 $\mu$m, the base material was placed in the electric furnace (601) and 1 LSM of $N_2$ gas was supplied via the gas supply line 602 into the electric furnace (601). The temperature of the electric furnace was raised at a rate of 2° C./min up to 200° C. The sample was maintained at 200° C. in a nitrogen atmosphere for 2 hours so that water was removed from the surface of the base material. The temperature was then decreased at a rate of 2° C./min down to 100° C. The temperature was maintained at 100° C. and the gas line was switched so that 5% $N_2/O_2$ gas was supplied at a total flow rate of 1 LSM to the electric furnace via the ozone generator. The output of the ozone generator was controlled so that the ozone concentration in the electric furnace was maintained at 10 g/cm$^3$. Under the above conditions, heat treatment was performed for 2 hours.

In this way, the ozone-processed base material was prepared.

As in the first example, a laser chamber was produced using the above base material, and its characteristics were evaluated.

The evaluated gas supply frequency was once every $9\times10^6$ pulses, the discharging stability $6.5\times10^8$ pulses, and the life $5.5\times10^9$ pulses.

EXAMPLE 7

Using a laser gas supply system having the construction shown in FIG. 17, a discharging gas was supplied into a laser chamber having the same structure as that shown in FIG. 4 so that the laser chamber was filled with the discharging gas.

In the above process of supplying discharging gas, the mass flow controller 401 was set to a predetermined flow rate and 1% $F_2$/1% Kr/Ne gas was supplied into the chamber C11 for a predetermined time period. Similarly, the mass flow controller 401 was set to a predetermined flow rate and 1% Kr/Ne gas was supplied into the chamber C11 for a predetermined time period so that the ratio of the amount of the former gas introduced into the chamber (given by the product of the flow rate and the supply time) to that of the latter gas was 1:9.

According to this method, it is possible to control the mixing ratio of 1% $F_2$/1% Kr/Ne gas and 1% Kr/Ne gas more precisely than can be achieved by the conventional method, and thus it is possible to improve the reproducibility in the laser output power.

The gas sources of the laser gas supply system shown in FIG. 17 were replaced as follows.

First, the valves 501b, 502b, and 503b were closed and the valves 501a, 502a, and 503a were opened. Then the valve 504a was opened so that high-purity $N_2$ gas was introduced into the gas supply pipes. Then the gas sources were disconnected from the gas supply pipes at the connectors (not shown) located along line A–A', and new gas sources were connected to the gas supply pipes. During the replacing operation, $N_2$ gas was supplied from the $N_2$ supply line to the above gas supply pipes so that $N_2$ gas always blew out from the pipes. After connecting the new gas sources to the gas supply pipes, the valves 501a, 502a, and 503a were closed and then the valve 504a wa closed. Then the valves 501b, 502b, and 503b were opened and the inside of the pipes was evacuated by a vacuum pump via the manifold C04. In this example, using a similar purging system provided on the gas source side, an inert gas was passed through the gas pipes directly connected to the gas sources thereby preventing the gas sources from being contaminated with atmosphere during the above replacing operation.

After the evacuation, high-purity $N_2$ gas was passed through the gas supply pipes for a predetermined time. Then the gas supply pipes were evacuated again. The laser chamber was then filled with a laser gas. The laser generator was operated, and its optical output power and the stability thereof were evaluated.

In the case where the gas supply system shown in FIG. 17 is employed, it is possible to supply the laser gas into the laser chamber immediately after evacuating $N_2$ gas without having to perform purging. Thus it is possible to quickly start the operation of the laser generating system. The optical output power at a specified level can be obtained immediately. Good instability is also obtained immediately after starting the operation.

With the technique of the present example, as described above, it is possible to precisely control the concentrations of gases introduced into the laser chamber, thereby achieving good reproducibility in the laser pulse output power and ensuring that stable laser beam generation can be achieved even immediately after replacing a gas source or any other part of the excimer laser generating system.

Furthermore, the replacement life of the laser chamber becomes longer. The stability of discharging is also improved. The gas supplying frequency can be reduced to a very low level.

EXAMPLE 8

In this eighth example, a fluoride passivation film including aluminum fluoride and magnesium fluoride was formed on the inner surface of a laser chamber having the same structure as that shown in FIG. 4. The procedure of forming the fluoride passivation film will be described in detail below.

Figure 18:
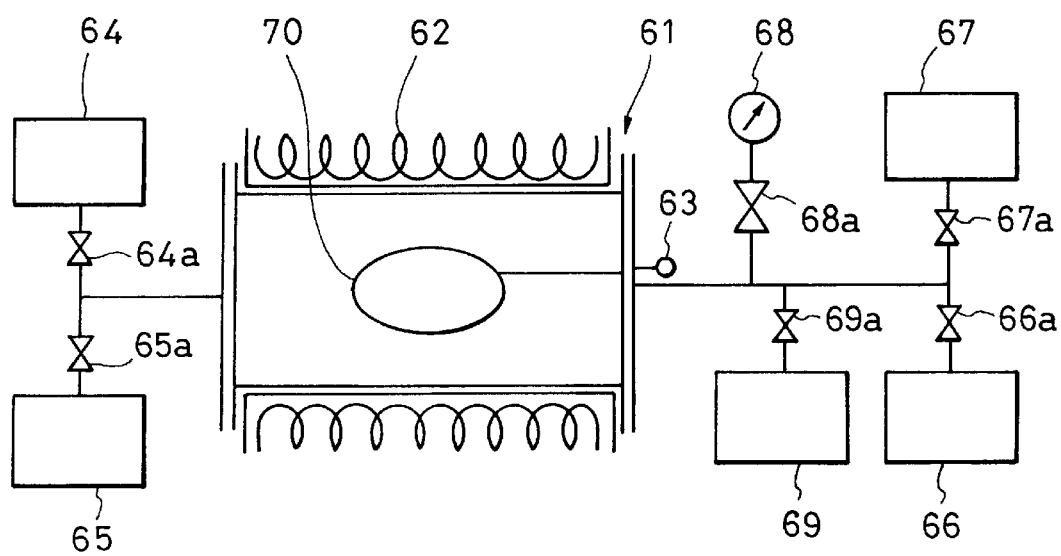
FIG. 18 is a schematic diagram of a system for forming a fluoride passivation film.

First, the fluorination process will be described with reference to FIG. 18. As shown in FIG. 18, the system used here includes a closed process chamber 61 for performing baking and fluorination process. The process chamber 61 is provided with heating means 62. The temperature in the process chamber 61 can be measured and indicated by a temperature detector 63.

The process chamber 61 is connected to gas supply sources 64 and 65 via valves 64a and 65b, respectively, so that high-purity fluorine gas and nitrogen gas can be supplied into the process chamber 61.

The process chamber 61 is also connected via valves 66a and 67a to a vacuum pump 66 and an exhaust unit 67 wherein a pressure gauge 68 and a dew-point meter 69 are connected via valves 68a and 69a to the above connection path.

In this specific example, an alloy of Al—3.5 wt % Mg–0.12 wt % Zr was used as a base material. The impurities such as Mn, Si, Fe, Cu, Cr, or Zn in the base material were each less than 0.05% by weight.

The surface of the base material 70 was electro-polished so as to obtain good surface flatness, and the surface was cleaned with acid. The base material 70 was then placed in the processing chamber 61.

The base material 70 was then fluorinated as follows.

While maintaining the base material 70 in the process chamber 61, the inside of the process chamber 61 was evacuated by the vacuum pump 66. The valves of the vacuum pump 66 and exhaust unit 67 were closed, and high-purity nitrogen gas was introduced via a valve into the process chamber 61.

The base material in the processing chamber 61 was baked at 300° C. for 2 hours so that water and other contaminants were evaporated from the surface of the aluminum alloy base material 70. The evaporated water was exhausted from the process chamber 61 by the vacuum pump 66. The dew-point of the exhausted gas was measured with the dew-point meter 68 thereby monitoring the process of baking the base material.

After the completion of the baking, the valve 65a was closed and the inside of the process chamber 61 was evacuated by the vacuum pump 66. Then the valves of the vacuum pump 66 and exhaust unit 67 were closed and the valve 64a was opened so as to supply high-purity fluorine gas with an impurity concentration less than 10 ppb into the process chamber 61. The inside of the process chamber 61 was maintained at 300° C. for 1 hour thereby performing fluorination process on the base material.

After the fluorination process, the inside of the process chamber 61 was evacuated again. Then nitrogen gas was supplied into the process chamber 61, and heat treatment was performed at 450° C. for 2 hours.

As a result of the above process, a 100 nm thick fluoride passivation film including aluminum fluoride and magnesium fluoride was formed on the surface of the aluminum alloy base material.

The obtained fluoride passivation film was analyzed by ESCA (electron spectroscopy for chemical analysis). The analysis has revealed that the chief ingredient of the fluorinated film is magnesium fluoride and aluminum fluoride is included as another ingredient.

In this way, housing members 13 and 14 were prepared.

After that, a heat exchanger 24, a blower 23, electrodes 18 and 19, and other elements were set in the right places thereby producing a laser chamber 1 having the structure shown in FIG. 2. In this example, the heat exchanger 24 was made up of an electro-polished JIA5052 material and the blower 23 was made up of an electro-polished SUS316L material.

This laser chamber was assembled into a system similar to that shown in FIG. 1, and $F_2$, Kr, and Ne were supplied from the gas supply system shown in FIG. 17 into the laser chamber so as to fill the laser chamber with these gases.

The obtained excimer laser generating system was evaluated in terms of the following characteristics.

GAS SUPPLYING FREQUENCY

With the optical monitor module 4, the laser output power was measured for each pulse and the number of pulses was counted until the laser output power fell down to a level lower than the allowable minimum value and thus a supply of fluorine gas was required.

In this specific example, the counted number of pulses was $1 \times 10^7$.

STABILITY OF DISCHARGING

With the optical monitor module 4, the energy and the shape of each pulse were measured, and the number of pulses was counted until the variations in the pulse energy and shape had finally reached 5%.

In this specific example, the resultant number of pulses was $5 \times 10^8$.

LIFE OF THE EXCIMER LASER GENERATOR

The life of the excimer laser generating system was evaluated by counting the number of pulses which could be generated before the laser chamber became so degraded that the replacement was required.

The evaluated life was $6 \times 10^9$ pulses in this example.

Then the laser chamber was filled with gas containing 0.5 ppm of intentionally incorporated water, and the laser pulse was generated for evaluation. Even under such a condition, the excimer laser generating system of the present invention showed as long a life as 10 times that achieved in the conventional excimer laser generating system.

EXAMPLE 9

In this ninth example, the blower 23 in the laser chamber was made up of the same aluminum alloy as that employed to form the housing members in the eighth example, and an aluminum oxide film was formed on the surface of the blower 23 in a similar manner employed for the housing members in the eighth example. The other parts were the same as those in the eighth example.

Under the same conditions as in the eighth example, the fluoride passivation film containing aluminum fluoride and magnesium fluoride was formed to a thickness of 100 nm.

The obtained excimer laser generating system was then evaluated in a similar manner to the previous example. The result is shown below.

Gas supplying frequency: once every $2 \times 10^7$ pulses
Discharging stability: $5 \times 10^8$ pulses
Life: $6 \times 10^9$ pulses

EXAMPLE 10

In this tenth example, the heat exchanger was made up of the same aluminum alloy material covered with a fluoride passivation film as that employed to form the housing members in the eighth example.

The other parts were the same as those in the eighth example and thus the blower was made up of an electro-polished SUS316L material.

Under the same conditions as in the eighth example, the fluoride passivation film was formed to a thickness of 100 nm.

The obtained excimer laser generating system was then evaluated in a similar manner to the eighth example. The result is shown below.
Gas supplying frequency: once every $3\times10^7$ pulses
Discharging stability: $6\times10^8$ pulses
Life: $5\times10^9$ pulses

EXAMPLE 11

In this eleventh example, the inner wall of the chamber, the surface of the blower, and the surface of the heat exchanger were all covered with a fluoride passivation film containing aluminum fluoride and magnesium fluoride.

The obtained excimer laser generating system was then evaluated in a similar manner to the eighth example. The result is shown below.
Gas supplying frequency: once every $6\times10^7$ pulses
Discharging stability: $7\times10^8$ pulses
Life: $7\times10^9$ pulses In this eleventh example, as the main parts were all covered with the fluoride passivation film containing aluminum fluoride and magnesium fluoride, great improvements were achieved in the gas supplying frequency, the discharging stability, and the life compared to those achieved in the eighth through tenth examples.

EXAMPLE 12

In this twelfth example, a fluoride film was formed in two different ways: (1) the fluoride film was formed only on the surface of the blower (the inner surface of the laser chamber and the surface of the heat exchanger had no fluoride film after being electro-polished); and (2) the fluoride film was formed only on the surface of the heat exchanger (the inner surface of the laser chamber and the surface of the blower had no fluoride film after being electro-polished). The evaluated gas supply frequency was once every $8\times10^6$ pulses for the case (1) and $9\times10^6$ pulses for the case (2). This result indicates that the surfaces of the blower and the heat exchanger also contribute to the gas supply frequency.

EXAMPLE 13

The effects of the base material were investigated.

The composition of the base material used here is shown in Table 2.

TABLE 2

| SAMPLE | Mg | Zr | B | Ti | IMPURITY | Al | EVALUATION RESULT |
|---|---|---|---|---|---|---|---|
| A | 2.5 | — | — | — | ≦0.05 | THE OTHER PART | Δ |
| B | 3.1 | — | — | — | ≦0.05 | THE OTHER PART | ○ |
| C | 4.0 | — | — | — | ≦0.05 | THE OTHER PART | ○ |
| D | 5.0 | — | — | — | ≦0.05 | THE OTHER PART | ○ |
| E | 5.5 | — | — | — | ≦0.05 | THE OTHER PART | POOR IN WORKABILITY |
| F | 3.5 | 0.06 | — | — | ≦0.05 | THE OTHER PART | ⊚ |
| G | 3.5 | — | 0.1 | — | ≦0.05 | THE OTHER PART | ⊚ |
| H | 4.0 | — | — | 0.14 | ≦0.05 | THE OTHER PART | ⊚ |
| I | 4.0 | — | — | — | Fe: 0.07 | THE OTHER PART | Δ |
| J | 4.0 | 0.17 | — | — | ≦0.05 | THE OTHER PART | POOR IN WORKABILITY |

*Evaluation was performed with respect to the gas supply frequency, discharging stability, and life wherein the result is represented by the following symbols:
Δ: Better than the conventional technique but poor than the eighth example;
○: Better than the conventional technique but slightly poor than the eighth example; and
⊚: Much better than the conventional technique and nearly equal to or even better than the eighth example.

EXAMPLE 14

Using a laser gas supply system having the construction shown in FIG. 17, a discharging gas was supplied into a laser chamber so that the laser chamber was filled with the discharging gas.

The mass flow controller 401 was set to a predetermined flow rate and 1% $F_2$/1% Kr/Ne gas was supplied into the chamber 53 for a predetermined time period. Similarly, the mass flow controller 401 was set to a predetermined flow rate and 1% Kr/Ne gas was supplied into the chamber 53 for a predetermined time period so that the ratio of the amount of the former gas introduced into the chamber (given by the product of the flow rate and the supply time) to that of the latter gas was 1:9.

According to this method, it is possible to control the mixing ratio of 1% $F_2$/1% Kr/Ne gas and 1% Kr/Ne gas more precisely than can be achieved by the conventional method, and thus it is possible to improve the reproducibility in the laser output power.

The gas sources of the laser gas supply system shown in FIG. 17 were replaced as follows.

Gas sources were replaced as follows. First, the valves 501b, 502b, and 503b were closed and the valves 501a, 502a, and 503a were opened. Then, the valve 504a was opened so that high-purity $N_2$ gas was introduced into the gas supply pipes. Then the gas sources were disconnected from the gas supply pipes at the connectors (not shown) located along line A–A', and new gas sources were connected to the gas supply pipes. During the replacing operation, $N_2$ gas was supplied from the $N_2$ supply line to the above gas supply pipes so that $N_2$ gas always blew out from the pipes. After connecting the new gas sources to the gas supply pipes, the valves 501a, 502a, and 503a were closed and then the valve 504a was closed. Then the valves 501b, 502b, and 503b were opened and the inside of the pipes was evacuated by a vacuum pump via the manifold C04. In this example, using a similar purging system provided on the gas source side, an inert gas was passed through the gas pipes directly connected to the gas sources thereby preventing the gas sources from being contaminated with atmosphere during the above replacing operation.

After the evacuation, high-purity $N_2$ gas was passed through the gas supply pipes for a predetermined time. Then the gas supply pipes were evacuated again. The laser chamber was then filled with a laser gas. The laser generator was operated, and its optical output power and the stability thereof were evaluated.

In the case where the gas supply system shown in FIG. 17 is employed, it is possible to supply the laser gas into the laser chamber immediately after evacuating $N_2$ gas without having to perform purging. Thus it is possible to quickly start the operation of the laser generating system. The optical output power at a specified level can be obtained immediately. Good instability is also obtained immediately after starting the operation.

With the technique of the present example, as described above, it is possible to precisely control the concentrations of gases introduced into the laser chamber, thereby achieving good reproducibility in the laser pulse output power and ensuring that stable laser beam generation can be achieved even immediately after replacing a gas source or any other part of the excimer laser generating system.

With the technique according to any of examples 8 to 14, as described above, the replacement life of the laser chamber becomes longer and the stability of discharging is also improved. Furthermore, the gas supplying frequency can be reduced to a very low level. The resistance to hydrogen plasma and thus no corrosion occurs even if water is present as an impurity in the gas.

Furthermore, it is possible to provide an excimer laser generating system which can be used in a highly reliable fashion for a long time to form a fine pattern having a line width as small as 0.25 $\mu$m or even less than that.

EXAMPLE 15

In this fifteenth example, a fluoride passivation film including iron fluoride was formed on the inner surface of a laser chamber having the same structure as that shown in FIG. 4. The procedure of forming the fluoride passivation film will be described in detail below.

The iron fluoride film was formed using the processing system shown in FIG. 18. As shown in FIG. 18, the system used here includes a closed process chamber 61 for performing baking and fluorination process. The process chamber 61 is provided with heating means 62. The temperature in the process chamber 61 can be measured and indicated by a temperature detector 63.

The process chamber 61 is connected to gas supply sources 64 and 65 via valves 64a and 65b, respectively, so that high-purity fluorine gas and nitrogen gas can be supplied into the process chamber 61.

The process chamber 61 is also connected via valves to a vacuum pump 66 and an exhaust unit 67 wherein a pressure gauge 68 and a dew-point meter 69 are connected via valves to the above connection path.

In this specific example, SUS316L was employed as the base material of the laser chamber.

The surface of the base material 70 was electro-polished so as to obtain good surface flatness, and the surface was cleaned with acid. The base material 70 was then placed in the processing chamber 61.

While maintaining the base material 70 in the process chamber 61, the inside of the process chamber 61 was evacuated by the vacuum pump 66. The valves of the vacuum pump 66 and exhaust unit 67 were closed. The valve 65a was then opened and high-purity nitrogen gas was introduced into the process chamber 61.

The base material in the processing chamber 61 was baked at 300° C. for 2 hours so that water and other contaminants were evaporated from the surface of the base material 70. The evaporated water and other contaminants were exhausted from the process chamber 61 by the vacuum pump 66. The dew-point of the exhausted gas was measured with the dew-point meter 68 thereby monitoring the process of baking the base material.

After the completion of the baking, the valve 65a was closed and the inside of the process chamber 61 was evacuated by the vacuum pump 66. Then the valves of the vacuum pump 66 and exhaust unit 67 were closed and the valve 64a was opened so as to supply high-purity fluorine gas into the process chamber 61. The inside of the process chamber 61 was maintained at 300° C. for 1 hour thereby performing fluorination on the base material.

After the fluorination process, the inside of the process chamber 61 was evacuated again. Then nitrogen gas was supplied into the process chamber 61, and heat treatment was performed at 450° C. for 1 hour.

As a result of the above process, a 210 nm thick fluoride passivation film including iron fluoride was formed on the surface of the SUS316L base material.

The obtained fluoride passivation film was analyzed by ESCA (electron spectroscopy for chemical analysis). The analysis has revealed that the composition of the fluoride passivation film includes $FeF_2$ and $CrF_2$.

In this way, housing members 13 and 14 were prepared.

After that, a heat exchanger 24, a blower 23, electrodes 18 and 19, and other elements were set in the right places so as to produce a laser chamber 1 having the structure shown in FIG. 4. In this example, the heat exchanger 24 was made up of an electro-polished JIS5052 material and the blower 23 was made up of an electro-polished SUS316L material.

This laser chamber was assembled into a system similar to that shown in FIG. 1, and $F_2$, Kr, and Ne were supplied from the gas supply system shown in FIG. 3 into the laser chamber so as to fill the laser chamber with these gases.

The obtained excimer laser generating system was evaluated in terms of the following characteristics.

GAS SUPPLYING FREQUENCY

With the optical monitor module 4, the laser output power was measured for each pulse and the number of pulses was counted until the laser output power fell down to a level lower than the allowable minimum value and thus a supply of fluorine gas was required.

In this specific example, the counted number of pulses was $7.5 \times 10^6$.

STABILITY OF DISCHARGING

With the optical monitor module 4, the energy and the shape of each pulse were measured, and the number of pulses was counted until the variations in the pulse energy and shape had finally reached 5%.

In this specific example, the resultant number of pulses was $2 \times 10^8$ pulses.

LIFE OF THE EXCIMER LASER GENERATOR

The life of the excimer laser generating system was evaluated by counting the number of pulses which could be generated before the laser chamber became so degraded that the replacement was required.

The evaluated life was $3.5 \times 10^9$ pulses in this example.

EXAMPLE 16

In this sixteenth example, fluorination was performed on the blower 23 in a similar manner to the fifteenth example so that an iron fluoride film was formed on the surface of the blower 23.

The obtained excimer laser generating system was evaluated in a similar manner to the previous example.

The result is shown below.
Gas supplying frequency: once every $9.5 \times 10^6$ pulses
Discharging stability: $2.5 \times 10^8$ pulses
Life: $3.8 \times 10^9$ pulses

EXAMPLE 17

In this seventeenth example, the heat exchanger was also covered with an iron fluoride film formed by performing fluorination process under the same conditions as the fifteenth example except that the heat treatment after the formation of the iron fluoride was performed at 300° C., while the blower was made up of an electro-polished SUS316L material.

The obtained excimer laser generating system was evaluated in a similar manner to the fifteenth example. The result is shown below.
Gas supplying frequency: once every $1.4 \times 10^7$ pulses
Discharging stability: $3.6 \times 10^8$ pulses
Life: $4.2 \times 10^9$ pulses The above result indicates that the heat exchanger as well as the blower contributes to the characteristics of the excimer laser generating system.

EXAMPLE 18

In this eighteenth example, the inner wall of the chamber, the surface of the blower, and the surface of the heat exchanger were all covered with an iron fluoride film.

The obtained excimer laser generating system was evaluated in a similar manner to the fifteenth example.

The result is shown below.
Gas supplying frequency: once every $1.8 \times 10^7$ pulses
Discharging stability: $4.2 \times 10^8$ pulses
Life: $4.5 \times 10^9$ pulses In this eighteenth example, as the main parts were all covered with the fluoride passivation film of iron fluoride, great improvements were achieved in the gas supplying frequency, the discharging stability, and the life compared to those achieved in the fifteenth through seventeenth examples.

EXAMPLE 19

Using a laser gas supply system having the construction shown in FIG. 16, a discharging gas was supplied into a laser chamber so that the laser chamber was filled with the discharging gas.

The mass flow controller 401 was Get to a predetermined flow rate and 1% $F_2$/1% Kr/Ne gas was supplied into the chamber for a predetermined time period. Similarly, the mass flow controller 401 was set to a predetermined flow rate and 1% Kr/Ne gas was supplied into the chamber for a predetermined time period so that the ratio of the amount of the former gas introduced into the chamber (given by the product of the flow rate and the supply time) to that of the latter gas was 1:9.

According to this method, the mixing ratio of 1% $F_2$/1% Kr/Ne gas and 1% Kr/Ne gas was controlled about ten times precisely than can be achieved by the conventional method, and corresponding improvement was achieved in the reproducibility in the laser output power.

EXAMPLE 20

In the laser gas supply system shown in FIG. 17 and also that shown in FIG. 16, the gas sources were replaced with new ones, and the time required for the gas supply system to be purged with high-purity nitrogen gas (with impurity concentration less than 10 ppb) to a degree enough for the laser generating system to stably generate a laser output at a specified power level was evaluated for both gas supply systems. In this experiment, the laser chamber employed in the fifteenth example was used.

For the gas supply system having the construction shown in FIG. 16, two systems were prepared and comparison was made between these two system. In one system, the inside of the system was electro-polished and then fluorinated so that the inner surface was entirely covered with an iron fluoride film.

In the case of the system shown in FIG. 17, the gas sources were replaced as follows. First, the valves 501*b*, 502*b*, and 503*b* were closed and the valves 501*a*, 502*a*, and 503*a* were opened. Then, the valve 504*a* was opened so that high-purity $N_2$ gas was introduced into the gas supply pipes. Then the gas sources were disconnected from the gas supply pipes at the connectors (not shown) located along line A–A', and new gas sources were connected to the gas supply pipes. During the replacing operation, $N_2$ gas was supplied from the $N_2$ supply line to the above gas supply pipes so that $N_2$ gas always blew out from the pipes. After connecting the new gas sources to the gas supply pipes, the valves 501*a*, 502*a*, and 503*a* were closed and then the valve 504*a* was closed. Then the valves 501*b*, 502*b*, and 503*b* were opened and the inside of the pipes was evacuated by a vacuum pump via the manifold C04. In this example, using a similar purging system provided on the gas source side, an inert gas was passed through the gas pipes directly connected to the gas sources thereby preventing the gas sources from being contaminated with atmosphere during the above replacing operation.

On the other hand in the case of the system shown in FIG. 16, after closing the valves of the gas supply pipes, the gas sources were replaced. The inside of the gas supply pipes was then evacuated.

In either case, after evacuating the inside of the gas supply pipes, high-purity $N_2$ gas was passed through the gas supply pipes for a certain time period. Then the gas supply pipes were evacuated again. Laser gas was then introduced into the laser chamber. A laser beam was generated, and its optical output power and stability were evaluated.

In the case where the gas supply system shown in FIG. 17 was employed, it was possible to supply the laser gas into the laser chamber immediately after evacuating $N_2$ gas without having to perform purging. Thus it was possible to quickly start the operation of the laser generating system. The optical output power at a specified level was obtained immediately. Good instability was also obtained immediately after starting the operation.

On the other hand, in the case where the gas supply system having the construction shown in FIG. 16 was employed, it was required to perform purging for 30 min for the system having a fluoride passivation film covering the inner surface thereof, and 3 hours for the system having an electro-polished inner surface with no fluoride passivation film.

With the technique according to any of examples 15 to 20, as described above, it is possible to generate a laser pulse which is stable in energy and shape. Furthermore, the gas supplying frequency can be reduced to a very low level. The replacement life of the laser gas and laser chamber becomes longer. The stability of discharging is also improved.

Furthermore, it is possible to precisely control the concentrations of gases introduced into the laser chamber, thereby achieving good reproducibility in the laser pulse output power and ensuring that stable laser beam generation can be achieved even immediately after replacing the gas sources.

It is also possible to provide a high-reliability step-and-repeat exposure apparatus capable of exposing a resist so as to form an extremely accurate and ultrafine pattern.

EXAMPLE 21

In this example, a nickel fluoride film was formed on the inner surface of a laser chamber having the same structure as that shown in FIG. 4. The process of forming the nickel fluoride film will be described more specifically below.

JIS6063 aluminum was employed as the base material.

Using this material, the housing 13 and 14 shown in FIG. 4 were produced. The thickness of the housing 13 and 14 was 15 mm.

Preprocessing for forming an underlying film was then performed. To remove an oxide film from the surface of the base material thereby making it possible to uniformly form an underlying film thereon, the surface of the base material was degreased using a surface active agent. Furthermore, the base material was slightly etched by 0.1 g/dm$^2$ in an acid solution thereby degreasing the base material and removing the oxide film from the surface of the base material.

The base material, whose surface became very active after the degreasing process, was immersed in an aqueous solution of alkali sodium zincate thereby performing zincate conversion process. After performing the zincate conversion process once, the base material was soaked in a 50% HNO$_3$ solution maintained at room temperature for 30 sec thereby degreasing the base material. After that, zincate conversion process was performed again. This method is known as the double zincate conversion process.

After performing preprocessing on the surface of the base material, nickel-phosphorus electroless plating is performed by immersing the base material in an aqueous solution containing a metallic salt of NiSO$_4$ (nickel sulfate) as a main ingredient, NaH$_2$PO$_2$ (sodium hypophosphite) serving as a reducing agent, an organic acid (complexing agent) serving as an auxiliary agent, and a stabilizing agent.

The electroless plating was performed so that the resultant nickel-phosphorus film serving as the underlying film had a thickness of about 1 μm and so that the phosphorus content of the plated film was 12 wt %.

The base material covered with the above plated film was etched for about 1 min in a 1% HF aqueous solution. The base material was then cleaned with water, dried, and baked in a nitrogen gas ambient thereby performing outgassing and removing contaminants from the surface of the base material. The surface of the base material was then fluorinated so as to form a metal fluoride (NiF$_2$) serving as a fluoride passivation film on the surface of the base material. Then the base material was subjected again to heat treatment in an inert gas ambient. The above fluorination was performed by exposing the base material to 100% F$_2$ gas (containing an unintentional impurity of water with concentration less than 10 ppb) at a normal pressure.

The above baking was performed at 350° C. for 5 hours, and the fluorination following the baking was performed at 350° C. for 5 hours. The heat treatment after the fluorination was performed in an inert gas ambient of N$_2$ at 350° C. for 5 hours.

In this way, housing members 13 and 14 were produced.

After that, a heat exchanger 24, a blower 23, electrodes 18 and 19, and other elements were set in the right places thereby producing a laser chamber 1.

In this example, the heat exchanger 24 was made up of an electro-polished JIA5052 material and the blower 23 was made up of an electro-polished SUS316L material. Before setting these elements, they were kept in a fluorine gas ambient and then assembled into the chamber.

This laser chamber was assembled into a system similar to that shown in FIG. 1, and F$_2$, Kr, and Ne were supplied from the gas supply system shown in FIG. 3 into the laser chamber so as to fill the laser chamber with these gases.

The obtained excimer laser generating system was evaluated in terms of the following characteristics.

GAS SUPPLYING FREQUENCY

With the optical monitor module 4, the laser output power was measured for each pulse and the number of pulses was counted until the laser output power fell down to a level lower than the allowable minimum value and thus a supply of fluorine gas was required. In this specific example, the counted number of pulses was 8×10$^6$.

STABILITY OF DISCHARGING

With the optical monitor module 4, the energy and the shape of each pulse were measured, and the number of pulses was counted until the variations in the pulse energy and shape had finally reached 5%. In this specific example, the resultant number of pulses was 2×10$^8$ pulses.

LIFE OF THE EXCIMER LASER GENERATOR

The life was evaluated by counting the pulses which could be generated before degradation of the laser chamber became so great that the optical output could no longer be recovered to the specified level unless the laser chamber was replaced by a new one.

The evaluated life was 6×10$^9$ pulses in this example.

EXAMPLE 22

In this example, the effects of the thickness of the fluoride film were investigated.

Samples covered with a fluoride passivation film having various thicknesses were prepared by varying the thickness of the plated nickel-phosphorus alloy film, the temperature and time of the fluorination process, the temperature and time of the annealing process performed after the fluorination. The thicknesses of the obtained fluoride passivation film were 0 nm, 30 nm, 90 nm, 100 nm, 200 nm, and 220 nm.

Excimer laser generating systems were produced so that the other parts except for the thickness of the fluoride passivation film were the same as those of the previous embodiment.

The gas supplying frequency, the discharging stability, and the lifer were evaluated in a similar manner to the twenty-first example. The result is listed in Table 3.

TABLE 3

| FILM THICKNESS | GAS SUPPLYING FREQUENCY | DISCHARGING STABILITY | LIFE | TECHNOLOGY |
|---|---|---|---|---|
| 0 | 5 × 10$^6$ | 8 × 10$^7$ | 3 × 10$^9$ | CONVENTIONAL TECHNIQUE |
| 30 | 5 × 10$^6$ | 1 × 10$^8$ | 4 × 10$^9$ | THIS INVENTION |
| 90 | 5 × 10$^6$ | 1 × 10$^8$ | 4 × 10$^9$ | THIS INVENTION |

TABLE 3-continued

| FILM THICKNESS | GAS SUPPLYING FREQUENCY | DISCHARGING STABILITY | LIFE | TECHNOLOGY |
|---|---|---|---|---|
| 100 | $8 \times 10^6$ | $2 \times 10^8$ | $5 \times 10^9$ | THIS INVENTION |
| 200 | $8 \times 10^6$ | $2 \times 10^8$ | $6 \times 10^9$ | THIS INVENTION |
| 220 | $7 \times 10^6$ | $2 \times 10^8$ | $6 \times 10^9$ | THIS INVENTION |

As can be seen from Table 3, when the thickness of the nickel fluoride passivation film is greater than 100 nm, improvements not only in the discharging stability and life are obtained but also an improvement in the gas supplying frequency can be achieved.

If the thickness exceeds 200 nm, no further improvements are achieved while slight separation occurs.

EXAMPLE 23

In the twenty-first example, the blower in the laser chamber was made up of an electro-polished SUS316L material. In contrast, a blower made up of an SUS316L material whose surface was covered with a nickel fluoride film serving as a fluoride passivation film was employed in this twenty-third example.

The other parts were the same as those in the twenty-first example.

Under the same conditions as in the twenty-first example, the nickel fluoride film was formed to a thickness of 100 nm.

The obtained excimer laser generating system was then evaluated in a similar manner to the twenty-first example. The result is shown below.
Gas supplying frequency: once every $1.4 \times 10^7$ pulses
Discharging stability: $3 \times 10^8$ pulses
Life: $5 \times 10^9$ pulses

EXAMPLE 24

In this example, a heat exchanger made up of a JIS5052 material whose surface was covered with a nickel-fluoride film was employed.

The other parts were the same as those of the twenty-first example and the blower was made up of an electro-polished SUS316L material.

Under the same conditions as in the twenty-first example, the nickel fluoride film was formed to a thickness of 100 nm.

The obtained excimer laser generating system was then evaluated in a similar manner to the twenty-first example. The result is shown below.
Gas supplying frequency: one every $1.9 \times 10^7$ pulses
Discharging stability: $3 \times 10^8$ pulses
Life: $5 \times 10^9$ pulses

EXAMPLE 25

In this twenty-fifth example, the inner wall of the chamber, the surface of the blower, and the surface of the heat exchanger were all covered with a nickel fluoride film.

The obtained excimer laser generating system was then evaluated in a similar manner to the twenty-first example. The result is shown below.
Gas supplying frequency: once every $2.4 \times 10^7$ pulses
Discharging stability: $5 \times 10^8$ pulses
Life: $6 \times 10^9$ pulses In this twenty-fifth example, as the main parts were all covered with the nickel fluoride film, great improvements were achieved in the gas supplying frequency, the discharging stability, and the life compared to those achieved in the twenty-first through twenty-fourth examples.

EXAMPLE 26

In this twenty-sixth example, a nickel fluoride film was formed in two different ways: (1) the nickel fluoride film was formed only on the surface of the blower (the inner surface of the laser chamber and the surface of the heat exchanger had no nickel fluoride film after being electro-polished); and (2) the nickel fluoride film was formed only on the surface of the heat exchanger (the inner surface of the laser chamber and the surface of the blower had no nickel fluoride film after being electro-polished).

The evaluated gas supply frequency was once every $6.8 \times 10^6$ pulses for the case (1) and $6.3 \times 10^6$ pulses for the case (2).

EXAMPLE 27

Using a laser gas supply system having the construction shown in FIG. 17, a discharging gas was supplied into a laser chamber so that the laser chamber was filled with the discharging gas.

The mass flow controller 401 was set to a predetermined flow rate and 1% $F_2$/1% Kr/Ne gas was supplied into the chamber 53 for a predetermined time period. Similarly, the mass flow controller 401 was set to a predetermined flow rate and 1% Kr/Ne gas was supplied into the chamber 53 for a predetermined time period so that the ratio of the amount of the former gas introduced into the chamber (given by the product of the flow rate and the supply time) to that of the latter gas was 1:9.

According to this method, the mixing ratio of 1% $F_2$/1% Kr/Ne gas and 1% Kr/Ne gas was controlled more precisely than can be achieved by the conventional method, and corresponding improvement was achieved in the reproducibility in the laser output power.

The gas sources of the laser gas supply system shown in FIG. 17 were replaced as follows.

Gas sources was replaced as follows. First, the valves 501b, 502b, and 503b are closed and the valves 501a, 502a, and 503a are opened. Then the valve 504a is opened so that high-purity $N_2$ gas is introduced into the gas supply pipes. Then the gas sources were disconnected from the gas supply pipes at the connectors (not shown) located along line A–A', and new gas sources were connected to the gas supply pipes. During the replacing operation, $N_2$ gas was supplied from the $N_2$ supply line to the above gas supply pipes so that $N_2$ gas always blew out from the pipes. After connecting the new gas sources to the gas supply pipes, the valves 501a, 502a, and 503a were closed and then the valve 504a wa closed. Then the valves 501b, 502b, and 503b were opened and the inside of the pipes was evacuated by a vacuum pump via the manifold C04. In this example, using a similar purging system provided on the gas source side, an inert gas was passed through the gas pipes directly connected to the gas sources thereby preventing the gas sources from being contaminated with atmosphere during the above replacing operation.

After the evacuation, high-purity $N_2$ gas was passed through the gas supply pipes for a predetermined time. Then the gas supply pipes were evacuated again. The laser chamber was then filled with a laser gas. The laser generator was operated, and its optical output power and the stability thereof were evaluated.

In the case where the gas supply system shown in FIG. 17 is employed, it is possible to supply the laser gas into the laser chamber immediately after evacuating $N_2$ gas without having to perform purging. Thus it is possible to quickly start the operation of the laser generating system. The optical output power at a specified level can be obtained immediately. Good instability is also obtained immediately after starting the operation.

With the technique of the present example, as described above, it is possible to precisely control the concentrations of gases introduced into the laser chamber, thereby achieving good reproducibility in the laser pulse output power and ensuring that stable laser beam generation can be achieved even immediately after replacing a gas source or any other part of the excimer laser generating system.

Furthermore, the replacement life of the laser chamber becomes longer. The stability of discharging is also improved. The gas supplying frequency can be reduced to a very low level.

EXAMPLE 28

Figure 19:
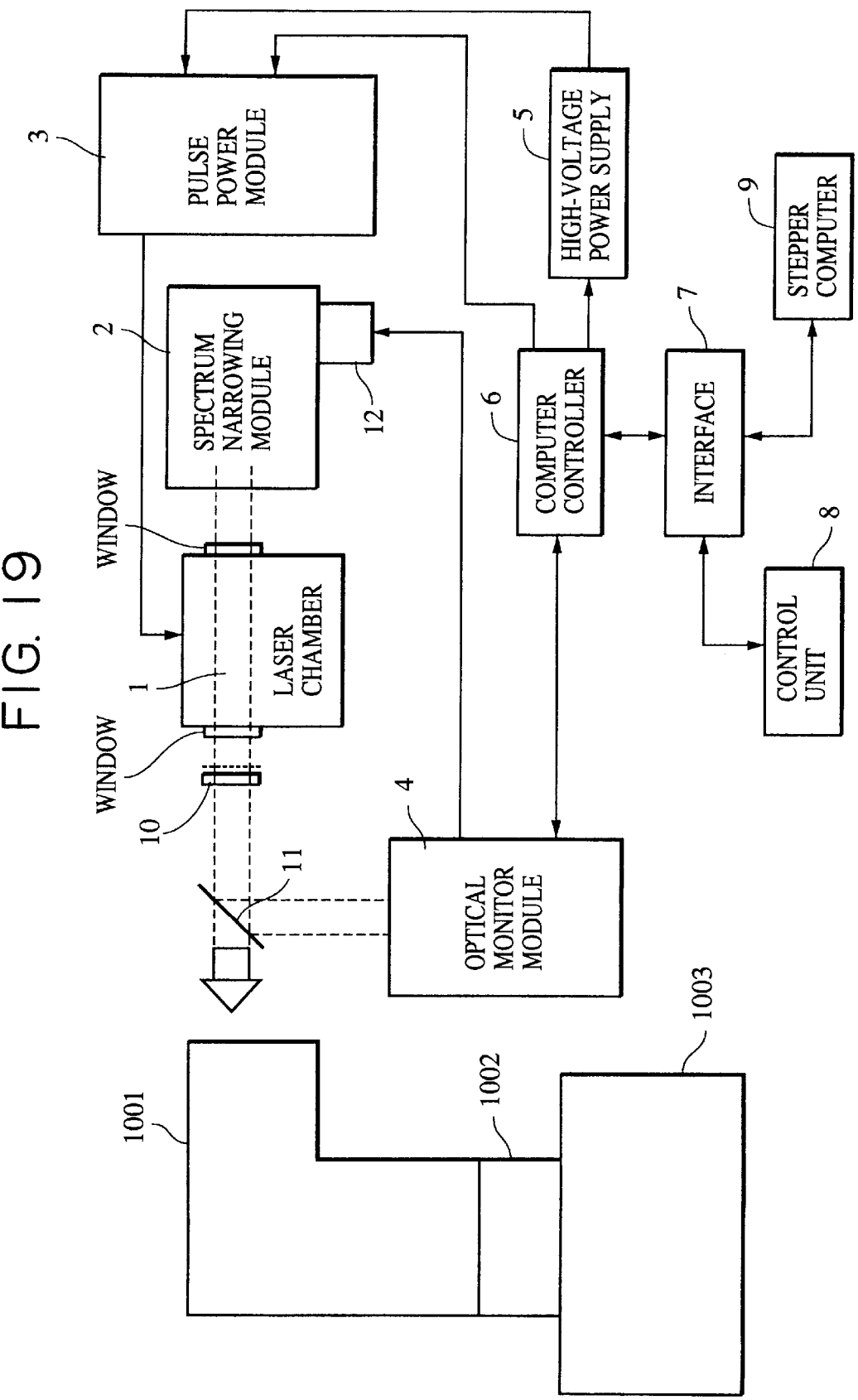
FIG. 19 is a schematic diagram of an exposure apparatus including an excimer laser generating system according to the present invention.

FIG. 19 illustrates an example of an exposure apparatus having an excimer laser generating system according to the present invention.

As shown in FIG. 19, the exposure apparatus includes: an illuminating optical system 1001; mean 1002 for holding a reticle serving as an exposure mask; a stage 1003 for holding and carrying a semiconductor wafer or glass substrate to be exposed; and means for transferring the semiconductor wafer or the glass substrate.

Although the present invention has been described above with reference to specific embodiments and examples, the present invention is not limited to the details of these.

Various modifications, changes, and substitutions are possible without departing from the spirit and scope of the invention.

What is claimed is:

1. An excimer laser generator comprising:
   a laser chamber having an optical axis and a fluorine-passivated inner surface;
   a blower located inside said laser chamber for generating a flow of any gas therein, said blower having a surface that, during operation of the generator, is exposed to any gas that is in said laser chamber, said surface being fluorine-passivated;
   a heat exchanger located inside said laser chamber and having a surface that, during operation of the generator, is exposed to any gas that is in said laser chamber, said surface being fluorine-passivated; and
   a pair of windows disposed along the optical axis of said laser chamber and formed in the walls of said laser chamber, each window having a fluorine-passivated inner surface,
   wherein at least one of the fluorine-passivated inner surface of said laser chamber, the fluorine-passivated inner surfaces of said windows, the fluorine-passivated surface of said blower, and the fluorine-passivated surface of said heat exchanger comprises an aluminum oxide film having a surface roughness Ra≦0.1 μm, and
   wherein said aluminum oxide film has a composition comprising:
   Mg: between 2.0 and 5.0% by weight;
   impurities: less than 100 ppm; and
   Al: the remainder of the composition.

2. An excimer laser generator according to claim 1, wherein the composition of each window of said pair of windows is selected from the group consisting of quartz and calcium fluoride.

3. A blower for use in a laser chamber to generate a flow of any gas present inside said laser chamber,
   wherein gas-contacting surfaces of said blower are fluorine-passivated with an aluminum oxide film having a surface roughness Ra≦0.1 μm, and
   wherein said aluminum oxide film has a composition comprising:
   Mg: between 2.0 and 5.0% by weight;
   impurities: less than 100 ppm; and
   Al: the remainder of the composition.

4. A heat exchanger for use in a laser chamber to reduce the temperature of any gas present inside said laser chamber,
   wherein gas-contacting surfaces of said heat exchanger are fluorine-passivated with an aluminum oxide film having a surface roughness Ra≦0.1 μm, and
   wherein said aluminum oxide film has a composition comprising:
   Mg: between 2.0 and 5.0% by weight;
   impurities: less than 100 ppm; and
   Al: the remainder of the composition.

5. An excimer laser generator comprising:
   a laser chamber having an optical axis and a fluorine-passivated inner surface;
   a blower located inside said laser chamber for generating a flow of gas therein, said blower having a surface that, during operation of the generator, is exposed to any gas that is in said laser chamber, said surface being fluorine-passivated;
   a heat exchanger located inside said laser chamber and having a surface that, during operation of the generator, is exposed to any gas that is in said laser chamber, said surface being fluorine-passivated; and
   a pair of windows disposed along the optical axis of said laser chamber and formed in the walls of said laser chamber, each window having a fluorine-passivated inner surface,
   wherein at least one of the fluorine passivated inner surface of said laser chamber, the fluorine-passivated inner surfaces of said windows, the fluorine-passivated exposed surface of said blower, and the fluorine-passivated exposed surface of said heat exchanger consists essentially of an aluminum oxide film having a surface roughness Ra≦0.1 μm, and
   wherein said aluminum oxide film has a composition comprising:
   Mg: 2.0 to 5.0% by weight;
   Zr: 0.05 to 0.15% by weight;
   impurities: less than 100 ppm; and
   Al: the remainder of the composition.

6. An excimer laser generator, comprising:
   a laser chamber having a fluorine-passivated inner surface;
   a blower located inside said laser chamber for generating a flow of any gas therein, said blower having a surface that, during operation of the generator, is exposed to any gas that is in said laser chamber, said surface being fluorine-passivated;
   a heat exchanger located inside said laser chamber and having a surface that, during operation of the generator, is exposed to any gas that is in said laser chamber, said surface being fluorine-passivated; and a gas supply system for supplying a gas to said laser chamber, said gas supply system including a manifold connected to a plurality of gas sources via a plurality of gas supply pipes, said manifold being connected to said laser chamber via a pipe, a purging system for purging said gas supply pipes with an inert gas, and a flow meter provided in said pipe.

7. An excimer laser generator according to claim 6, wherein said inner surface of said laser chamber is fluorine-passivated with a film comprising aluminum oxide having a surface roughness Ra≦0.1 μm.

8. An excimer laser generator according to claim 6, wherein said surface of said blower is fluorine-passivated with a film comprising aluminum oxide having a surface roughness Ra≦0.1 μm.

9. An excimer laser generator according to claim 6, wherein said surface of said heat exchanger is fluorine-passivated with a film comprising aluminum oxide having a surface roughness Ra≦0.1 μm.

10. An excimer laser generator according to any one of claims 7 to 9, wherein said aluminum oxide film has a composition comprising:

Mg: 2.0 to 5.0% by weight;

impurities: less than 100 ppm; and

Al: the remainder of the composition.

11. An excimer laser generator according to any one of claims 7 to 9, wherein said aluminum oxide film has a composition comprising:

Mg: 2.0 to 5.0% by weight;

Zr: 0.05 to 0.15% by weight;

impurities: less than 100 ppm; and

Al: the remainder of the composition.

12. An excimer laser generator according to claim 6, wherein said inner surface of said laser chamber is fluorine-passivated with a fluoride film comprising aluminum fluoride and magnesium fluoride.

13. An excimer laser generator according to claim 6, wherein said surface of said blower is fluorine-passivated with a fluoride film comprising aluminum fluoride and magnesium fluoride.

14. An excimer laser generator according to claim 6, wherein said surface of said heat exchanger is fluorine-passivated with a fluoride film comprising aluminum fluoride and magnesium fluoride.

15. An excimer laser generator according to any one of claims 12 to 14, wherein said film is on the surface of an aluminum alloy comprising 3% to 5% by weight of magnesium.

16. An excimer laser generator according to claim 15, wherein said aluminum alloy further comprises one or more elements selected from the group consisting of Zr, B, and Ti.

17. An excimer laser generator according to claim 16, wherein said aluminum alloy comprises 0.05% to 0.15% by weight of one or more elements selected from the group consisting of Zr, B, and Ti, and wherein any metal selected from the group consisting of Mn, Si, Fe, Cu, Cr, and Zn that is present in said aluminum alloy is present in an amount less than 0.05 wt%.

18. An excimer laser generator according to claim 6, wherein said inner surface of said laser chamber is fluorine-passivated with a fluoride film comprising iron fluoride.

19. An excimer laser generator according to claim 6, wherein said surface of said blower is fluorine-passivated with a fluoride film comprising iron fluoride.

20. An excimer laser generator according to claim 6, wherein said surface of said heat exchanger is fluorine-passivated with a fluoride film comprising iron fluoride.

21. An excimer laser generator according to claim 6, wherein said inner surface of said laser chamber is fluorine-passivated with a nickel fluoride film having a thickness equal to or greater than 100 nm.

22. An excimer laser generator according to claim 21, wherein said nickel fluoride film has a thickness in the range of 100 nm to 200 nm.

23. An excimer laser generator according to claim 6, wherein said surface of said blower is fluorine-passivated with a nickel fluoride film.

24. An excimer laser generator according to claim 23, wherein said nickel fluoride film has a thickness in the range of 100 nm to 200 nm.

25. An excimer laser generator according to claim 6, wherein said surface of said heat exchanger is fluorine-passivated with a nickel fluoride film.

26. An excimer laser generator according to claim 25, wherein said nickel fluoride film has a thickness in the range of 100 nm to 200 nm.

27. An excimer laser generator according to claim 26, further comprising a holder located inside said laser chamber for holding a pair of electrodes, wherein gas-contacting surfaces of said holder are fluorine-passivated.

28. An exposure apparatus, comprising:

an excimer laser generator according to any one of claims 1, 5, or 6;

an illuminating optical system for directing an output of said laser generator;

an imaging optical system for controlling the output of said laser generator;

a holder for holding a reticle through which the output of said laser generator passes; and a stage for holding a substrate onto which the output of said laser generator is directed.

29. A step-and-repeat exposure apparatus, comprising:

an excimer laser generator according to claims 1, 5, or 6; and a stage for carrying a substrate onto which an output of said laser generator is directed.

30. An excimer laser generator according to any one of claims 1 or 5, further comprising a gas supply system for supplying a gas to said laser chamber, said gas supply system including a plurality of gas sources each connected via their own gas supply pipe to a manifold, which is further connected to said laser chamber via a connection pipe, wherein at least those parts contacting $F_2$ gas are covered with a fluoride film.

31. An excimer laser generator according to claim 30, further comprising a flow meter provided in the path of said connection pipe.

32. An excimer laser generator according to claim 30, further comprising a purging system for purging each gas supply pipe of said plurality of gas sources with an inert gas.

33. A blower for use in a laser chamber to generate a flow of any gas present inside said laser chamber wherein gas-contacting surfaces of said blower are fluorine-passivated with an aluminum oxide film having a surface roughness Ra≦0.1 μm, and wherein said aluminum oxide film has a composition comprising:
Mg: 2.0 to 5.0% by weight;
Zr: 0.05 to 0.15% by weight;
impurities: less than 100 ppm; and
Al: the remainder of the composition.

34. A heat exchanger for use in a laser chamber to reduce the temperature of any gas present inside said laser chamber, wherein gas-contacting surfaces of said heat exchanger are fluorine-passivated with an aluminum oxide film having a surface roughness Ra≦0.1 μm, and wherein said aluminum oxide film has a composition comprising:
Mg: 2.0 to 5.0% by weight;
Zr: 0.05 to 0.15% by weight;
impurities: less than 100 ppm; and
Al: the remainder of the composition.

* * * * *

UNITED STATES PATENT AND TRADEMARK OFFICE
CERTIFICATE OF CORRECTION

PATENT NO. : 6,215,806 B1
DATED : April 10, 2001
INVENTOR(S) : Tadahiro Ohmi et al.

It is certified that error appears in the above-identified patent and that said Letters Patent is hereby corrected as shown below:

<u>Title page,</u>
Item [75], Inventors, "2-1-17-301, Komegafukuro, Aoba-ku, Sedai-shi;" should read -- Sendai-shi --

Item [73], Assignees, "Miyagi-ken," should read -- Sendai, --; and

Item [56], References Cited, under FOREIGN PATENT DOCUMENTS, "3215656" should read -- 3-215656 --.

<u>Column 2,</u>
Lines 38 and 47, "a" should read -- an --.

<u>Column 3,</u>
Line 8, "inventor" should read -- inventors --; and
Line 30, "short" should read -- a short --.

<u>Column 6,</u>
Line 4, close up right margin;
Line 8, "a and" should read -- a, and --; and close up right margin;
Line 18, "A5052 and" should read -- A5052, and --; and close up right margin;
Line 21, "FIG.12(A)" should read -- FIG. 12A --;
Line 22, close up right margin;
Line 23, "FIG. 12(B)" should read -- FIG. 12B --;
Line 30, "FIG. 15(A)" should read -- FIG. 15A --;
Line 32, close up right margin;
Line 33, "FIG. 15(B)" should read -- FIG. 15B --; and
Line 60, "blower." should read -- blower --.

<u>Column 7,</u>
Line 14, "the" should be deleted.

<u>Column 8,</u>
Line 46, "FIG. 7(A)," should read -- FIG. 7A, --; and
Line 54, "FIG. 7(B)," should read -- FIG. 7B, --.

<u>Column 9,</u>
Line 14, "an" should read -- a --.

UNITED STATES PATENT AND TRADEMARK OFFICE
CERTIFICATE OF CORRECTION

PATENT NO. : 6,215,806 B1
DATED : April 10, 2001
INVENTOR(S) : Tadahiro Ohmi et al.

It is certified that error appears in the above-identified patent and that said Letters Patent is hereby corrected as shown below:

Column 10,
Line 38, "illustrates" should read -- illustrate --;
Line 39, "MX534 respectively" should read -- MX534, respectively, --; and
Line 41, "those" should read -- these --.

Column 13,
Line 23, "$N_2$." should read -- $N_2$, --; and
Line 49, "be" should read -- is --; and "is" should read -- be --.

Column 14,
Line 61, "results" should read -- result --; and
Line 66, "an" should read -- a --.

Column 15,
Line 20, "an" should read -- a --; and
Line 47, "a" should be deleted.

Column 17,
Line 55, "FIG. 12(A)" should read -- FIG. 12A --;
Line 56, "FIG. 12(B)." should read -- FIG. 12B. --; and
Line 57, "FIGS. 12(A) and 12(B)," should read -- FIGS. 12A and 12B, --.

Column 18,
Line 1, "FIG. 12(A)," should read -- FIG. 12A, --;
Line 4, "FIG. 12(B)," should read -- FIG. 12B, --;
Line 39, "FIG.15(A)" should read -- FIG. 15A --;
Line 44, "FIG. 15(A)," should read -- FIG. 15A, --;
Line 46, "15(A)." should read -- 15A. --;
Line 48, "FIG. 15(B)" should read -- FIG. 15B --;
Line 55, "FIG. 15(B)," should read -- FIG. 15B, --;
Line 58, "FIG. 15(B)." should read -- FIG. 15B. --;
Line 59, "FIGS. 15(A) and 15(B)" should read -- FIGS. 15A and 15B --; and
Line 64, "inventor" should read -- inventors --; and
"has" should read -- have --.

Column 19,
Table 1, "ON" should be deleted.

Column 20,
Line 14, "the" should be deleted; and
Line 56, "affection," should read -- effect, --.

UNITED STATES PATENT AND TRADEMARK OFFICE
CERTIFICATE OF CORRECTION

PATENT NO. : 6,215,806 B1
DATED : April 10, 2001
INVENTOR(S) : Tadahiro Ohmi et al.

It is certified that error appears in the above-identified patent and that said Letters Patent is hereby corrected as shown below:

Column 21,
Line 51, "perform" should read -- formed --.

Column 24,
Line 26, "wa" should read -- was --.

Column 31,
Line 49, "Get" should read -- set --.

Column 32,
Line 9, "system." should read -- systems. --; and
Line 34, "hand" should read -- hand, --.

Column 34,
Line 50, "lifer" should read -- life --.

Column 36,
Line 45, "was" should read -- were --; and
Line 57, "wa" should read -- was --.

Column 37,
Line 30, "mean" should read -- means --.

Signed and Sealed this

Thirteenth Day of August, 2002

Attest:

JAMES E. ROGAN
Attesting Officer *Director of the United States Patent and Trademark Office*